(12) United States Patent
Wade et al.

(10) Patent No.: US 7,514,214 B2
(45) Date of Patent: Apr. 7, 2009

(54) SELECTIVE FUNCTIONALIZATION OF CARBON NANOTUBE TIPS ALLOWING FABRICATION OF NEW CLASSES OF NANOSCALE SENSING AND MANIPULATION TOOLS

(75) Inventors: Lawrence A. Wade, La Canada-Flintridge, CA (US); Ian R. Shapiro, Pasadena, CA (US); Charles Patrick Collier, San Marino, CA (US); Maria J. Esplandiu, Los Angeles, CA (US); Vern Garrett Bittner, Jr., Pasadena, CA (US); Konstantinos P. Giapis, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 1038 days.

(21) Appl. No.: 10/783,713

(22) Filed: Feb. 20, 2004

(65) Prior Publication Data

US 2005/0191427 A1    Sep. 1, 2005

Related U.S. Application Data

(60) Provisional application No. 60/499,210, filed on Feb. 21, 2003.

(51) Int. Cl.
*C12Q 1/68* (2006.01)
(52) U.S. Cl. .......................................... 435/6; 250/309
(58) Field of Classification Search .................. 250/309; 435/6, 5
See application file for complete search history.

(56) References Cited

U.S. PATENT DOCUMENTS 5,824,470 A * 10/1998 Baldeschwieler et al. ...... 435/6
2002/0122766 A1   9/2002 Lieber et al.

FOREIGN PATENT DOCUMENTS

WO    WO 98/05920    2/1998

OTHER PUBLICATIONS

Carano et al., A Glutathione Amperometric Biosensor Based on an Amphiphilic Fullerence Redox Mediator Immobilised within an Amphiphillic Polypyrrole Film, S.J. Mat. Chem. 12, 1996-2000 (2002).

(Continued)

*Primary Examiner*—Nikita Wells
*Assistant Examiner*—Johnnie L Smith, II
(74) *Attorney, Agent, or Firm*—Williams, Morgan & Amerson, P.C.

(57) ABSTRACT

Embodiments in accordance with the present invention relate to techniques for the growth and attachment of single wall carbon nanotubes (SWNT), facilitating their use as robust and well-characterized tools for AFM imaging and other applications. In accordance with one embodiment, SWNTs attached to an AFM tip can function as a structural scaffold for nanoscale device fabrication on a scanning probe. Such a probe can trigger, with nanometer precision, specific biochemical reactions or conformational changes in biological systems. The consequences of such triggering can be observed in real time by single-molecule fluorescence, electrical, and/or AFM sensing. Specific embodiments in accordance with the present invention utilize sensing and manipulation of individual molecules with carbon nanotubes, coupled with single-molecule fluorescence imaging, to allow observation of spectroscopic signals in response to mechanically induced molecular changes. Biological macromolecules such as proteins or DNA can be attached to nanotubes to create highly specific single-molecule probes for investigations of intermolecular dynamics, for assembling hybrid biological and nanoscale materials, or for developing molecular electronics. In one example, electrical wiring of single redox enzymes to carbon nanotube scanning probes allows observation and electrochemical control over single enzymatic reactions by monitoring fluorescence from a redox-active cofactor or the formation of fluorescent products. Enzymes "nanowired" to the tips of carbon nanotubes in accordance with embodiments of the present invention, may enable extremely sensitive probing of biological stimulus-response with high spatial resolution, including product-induced signal transduction.

16 Claims, 17 Drawing Sheets

OTHER PUBLICATIONS

Carbon Nanobube Tips for Atomic Force Microscopy, http://cmliris.harvard.edu/html_natalya/research/probes/tip.html, printed Feb. 17, 2004.

Chen et al., Noncovalent Sidewall Functionalization of Single-Walled Carbon Nanotubes for Protein Immobilization, J. Am. Chem. Soc., 123, pp. 3838-3839, (2001).

Cui et al., Nanowire Nanosensors for Highly Sensitive and Selective Detection of Biological and Chemical Species, Science, vol. 293, pp. 1289-1292, (2001).

Shim et al., Functionalization of Carbon Nanotubes for Biocompatibility and Bio-Molecular Recognition, Nano Lett. 2, No. 4, pp. 285-288 (2002).

Wade et al., Correlating AFM Probe Morphology to Image Resolution for Single-Wall Carbon Nanotube Tips, Nano Letters, 0, No. 0, A-G.

Wong et al., Carbon Nanotube Tips: High-Resolution Probers for Imaging Biological Systems, J. Am. Chem. Soc., 120, pp. 603-604 (1998).

Wong et al., Covalently Functionalized Nanotubes as Nanometer Probes for Chemistry and Biology, Nature, 294, pp. 52-55 (1998).

Wong et al., Covalently-Functionalized Single-Walled Carbon Nanotube Probe Tips for Chemical Force Microscopy, J. Am. Chem. Soc. 120, pp. 8557-8558, (1998).

Xiao et al., Plugging into Enzymes, Nanowiring of Redox Enzymes by a Gold Nanoparticle, Science, 299, 1877-1881, (2003).

Shim et al. Functionalization of Carbon Nanotubes for Biocompatibility and Biomolecular Recognition, Nano Lett, Jan. 2002, vol. 2, No. 4, pp. 285-288.

* cited by examiner

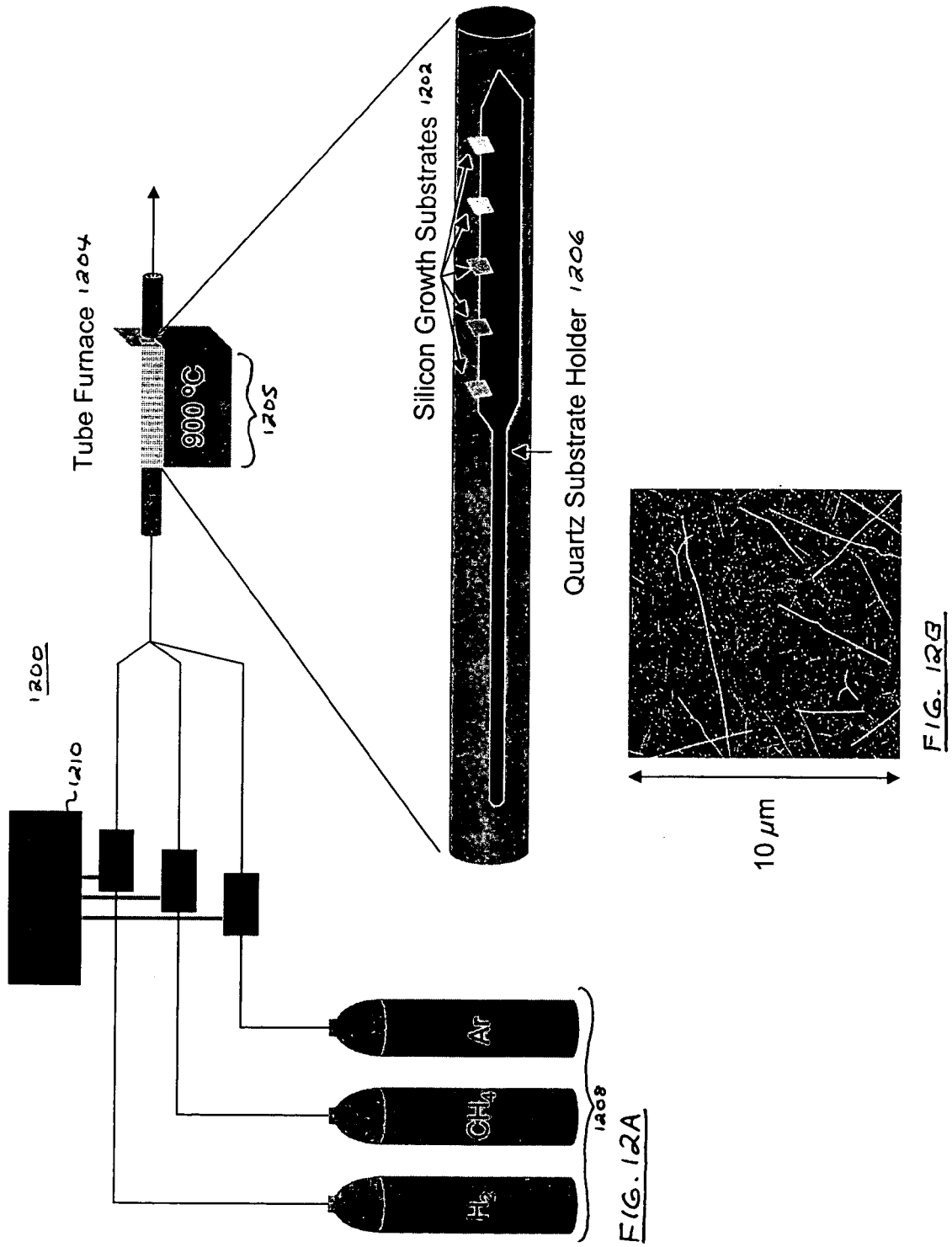

$$Ru(bpy)_3^{2+} \rightarrow Ru(bpy)_3^{3+} + e^-$$

$$Ru(bpy)_3^{3+} + TPA \rightarrow Ru(bpy)_3^{2+} + TPA^+$$

$$TPA^+ \rightarrow TPA^\bullet + H^+$$

$$Ru(bpy)_3^{3+} + TPA^\bullet \rightarrow Ru(bpy)_3^{2+*} + \text{products}$$

$$Ru(bpy)_3^{2+*} \rightarrow Ru(bpy)_3^{2+} + h\nu$$

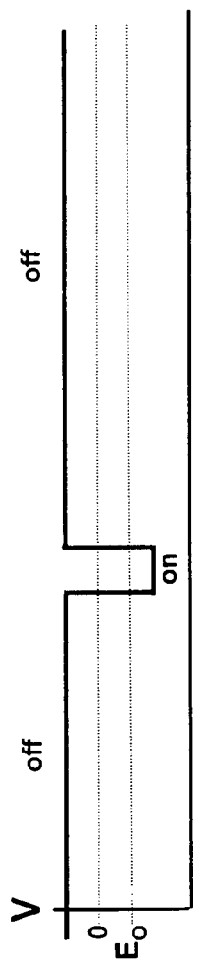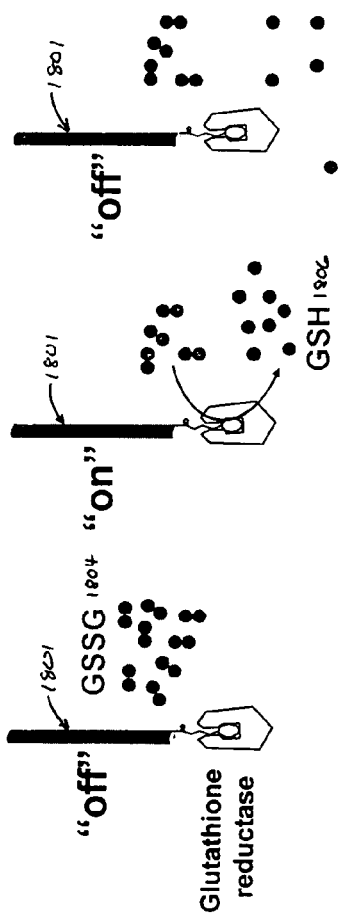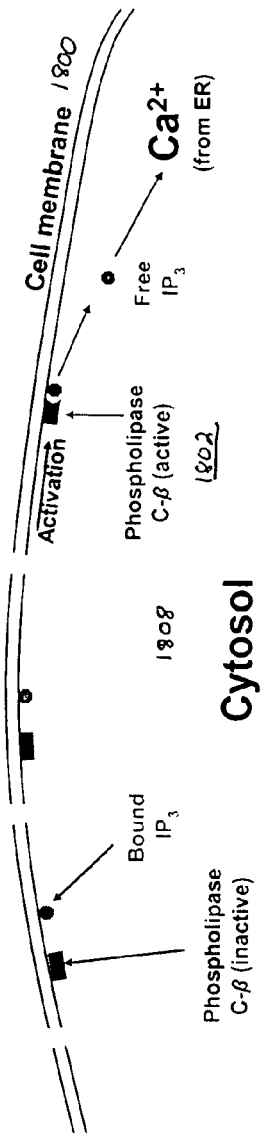

SELECTIVE FUNCTIONALIZATION OF CARBON NANOTUBE TIPS ALLOWING FABRICATION OF NEW CLASSES OF NANOSCALE SENSING AND MANIPULATION TOOLS

CROSS-REFERENCES TO RELATED APPLICATIONS

This application claims priority to U.S. Provisional patent application No. 60/449,210 filed Feb. 21, 2003, commonly assigned and incorporated by reference herein for all purposes.

STATEMENT AS TO RIGHTS TO INVENTIONS MADE UNDER FEDERALLY SPONSORED RESEARCH OR DEVELOPMENT

Work described herein has been supported, in part, by the Caltech President's Fund, which is co-administered between JPL (NASA contract NAS7-1407). The United States Government may therefore have certain rights in the invention.

BACKGROUND OF THE INVENTION

Carbon nanotubes hold great promise in many areas of science and technology, due to their unique physical properties and molecular-scale dimensions. A significant technological advance for these materials has been their incorporation as specific molecular transducers in nanosensors, molecular electronics and as molecular manipulation tools. This potential is based on the remarkable molecular recognition capabilities of carbon nanotubes through covalent chemical bonding, surface charge transfer or electrostatic changes when a specific molecule binds to a tube.

In order to achieve this specificity, nanotubes can be chemically, physically or biologically functionalized to recognize a particular target molecule and reject others in a complex environment. In addition, proof-of-principle demonstrations of nanotube functionalization for sensing or binding specific molecules in the gas and liquid phases have been successfully made.

The most commonly used geometry for nanotube based sensors is a chemically or biologically sensitive "field effect transistor". The nanotube serves as a wire connecting lithographically defined source and drain metal electrodes on a doped silicon substrate having a thin insulating silicon oxide surface layer. Binding occurs over the length of the sides of the nanotubes in these devices. The electrically-conductive doped silicon serves as a backgate; noncovalent binding of target molecules is detected by changes in conductance of the device.

Recent advances in nanotube fabrication and AFM imaging with nanotube tips have demonstrated the potential of these tools to achieve high resolution images. Carbon nanotubes have been attached or grown on silicon AFM tips as high resolution AFM probes.

FIGS. 1A-B show a scanning electron micrographs of individual carbon nanotubes mounted to a silicon AFM probe tip by our team. The nanotube was picked up from a flat substrate supporting SWNTs grown by metal catalyzed chemical vapor deposition.

SWNTs are in many respects, ideal high resolution probe tips for AFM. SWNTs are single carbon atom thick hollow cylinders that are microns in length with diameters ranging from 0.7 to 5 nm. They can be used as high aspect ratio probes with radii comparable to molecular scale dimensions.

Carbon nanotubes are chemically and mechanically robust. They are the stiffest material known, with Young's moduli of about 1.2 Tpa, which limits the noise due to thermal vibrations and bending from degrading the ultimate obtainable resolution. Unlike other materials, carbon nanotubes buckle elastically under large loads, limiting damage to both the tips and the sample. Because SWNTs have well-defined molecular structures, interpreting AFM data becomes much easier since the tip-sample interaction is well characterized and reproducible.

As shown by Wong et al., "Covalently-Functionalized Single-Walled Carbon Nanotube Probe Tips for Chemical Force Microscopy", *J. Am. Chem. Soc.* 120, 8557-8558 (1998), incorporated herein by reference for all purposes, SWNT AFM probe tips have been chemically functionalized uniquely at their very ends. This can be initiated by an electrical etching process, which is also used to shorten the attached SWNTs in order to achieve lengths suitable for high-resolution imaging. However, this approach still leaves the sides of the SWNT susceptible to non-specific binding of molecular species.

When SWNT tips are etched in an oxidizing environment (for example, in $O_2$ ambient), the ends become functionalized with one or more carboxyl groups, based on bulk measurements carried out on chemically oxidized nanotubes. The tip can be chemically modified further by coupling organic amines to the carboxylate to form amide bonds. Alternatively, by etching the SWNT in a nitrogen environment, SWNT ends become functionalized with one or more amine groups, directly. The use of reactive amino chemistry is a common biochemical conjugation technique, and can be exploited further to take advantage of a wide range of chemical and biological means available for attaching fluorophores, antibodies, ligands, proteins or nucleic acids to the ends of the nanotubes with well-defined orientations.

The manipulation of a ligand-protein interaction with specific single molecules chemically and biologically coupled to the nanotube tip has been measured with AFM by Wong et al, "Covalently Functionalized Nanotubes as Nanometer Probes for Chemistry and Biology", *Nature*, 394, 52-55 (1998), incorporated by reference herein for all purposes. However, nonspecific binding of molecules to the sidewalls of the nanotube is still frequent.

Often this is due to the hydrophobic nature of nanotubes. Hydrophobic sections of proteins or other biological molecules will bind to, and heavily coat, the nanotube sidewalls in a non-specific location. For example, in "Functionalization of Carbon Nanotubes for Biocompatibility and Bio-Molecular Recognition," *Nano Lett.* 2, 285 (2002), incorporated by reference herein for all purposes, Shim et al. have shown that the protein streptavidin nonspecifically binds to as-grown SWNTs unless this nonspecific binding is prevented by coating the nanotubes with a surfactant, such as Triton, and poly (ethylene glycol), PEG.

Thus while known approaches have offered promise, improved techniques for employing carbon nanotubes for sensing and other functions are highly desirable.

BRIEF SUMMARY OF THE INVENTION

Embodiments in accordance with the present invention describe a series of techniques, which used alone or in combination, enable the manufacture of a variety of nanoscale devices and sensors, including single-molecule sensors. Furthermore, these techniques enable the devices to be uniquely manufactured at a specific location. Typically, this is achieved through the use of an individual single wall carbon nanotube (SWNT) attached to a scanning atomic force microscope (AFM) tip as a structural scaffold. In alternative embodiments, the location of the functionalized SWNT may be changed relative to a target utilizing a nanoscanner, nanopositioner, or other manipulating device, as described in detail below.

Embodiments of the present invention enable construction of a wide variety of novel nanometer scale devices located at the sensing or exposed end of a nanotube AFM tip. These devices can be used for characterizing molecular conformations, chemical dynamics and behavior, intermolecular dynamics, and a wide variety of materials and devices at nanometer length scales. These devices will extend the utility and sensitivity of scanning probe microscopy in general.

Embodiments in accordance with the present invention rely on the concept of selectively modifying the (free) end of a functionalized SWNT AFM probe through electrical or electrochemical means, thereby fundamentally changing the chemical, electrical, and/or mechanical properties of the tube end relative to the rest of the probe. This modification can be carried out by electrically charging the SWNT through application of an electrical potential between the AFM cantilever and the substrate, leading to ablation or modification of material coating the nanotube tip.

The concept is general, and applies equally well in describing the construction of nanoscale probes based on SWNT functionalization using soft materials for possible use in biological applications, as well as metals, semiconductors and insulators, for building nanoscale solid-state electrical, magnetic and optical devices. The ability to incorporate specific device designs with high-level functionality into scanning probes represents a significant advance in the utility of scanning probe microscopy for nanotechnology, materials science and biophysics.

An embodiment of a method in accordance with the present invention for fabricating a nanostructure, comprises, coating a nanostructure with a passivation layer, and altering the passivation layer at a first position.

An embodiment of a device in accordance with the present invention, comprises, a nanostructure having a surface, and a passivation layer coating all but a unique site on the surface, the unique site exhibiting at least one of chemical, biological, electrical, and physical activity.

An embodiment of a method in accordance with the present invention for interacting with a local environment, comprises, providing a nanostructure having a surface coated by passivation excluding a unique site which exhibits at least one of chemical, biological, electrical, and physical activity. The unique site is then positioned in communication with the local environment.

Various additional objects, features and advantages of the present invention can be more fully appreciated with reference to the detailed description and accompanying drawings that follow.

BRIEF DESCRIPTION OF THE DRAWINGS

FIG. 12A shows a schematic view of an apparatus for achieving SWNT catalyzed vapor deposition growth.

FIG. 12B shows an AFM image of SWNTs grown on a pick-up substrate utilizing the apparatus shown in FIG. 12A.

FIG. 17A is a simplified schematic view showing use of a nanowired enzymatic probe.

FIG. 17B plots voltage versus time for the enzymatic probe of FIG. 17A.

DETAILED DESCRIPTION OF THE INVENTION

Figure 1A:
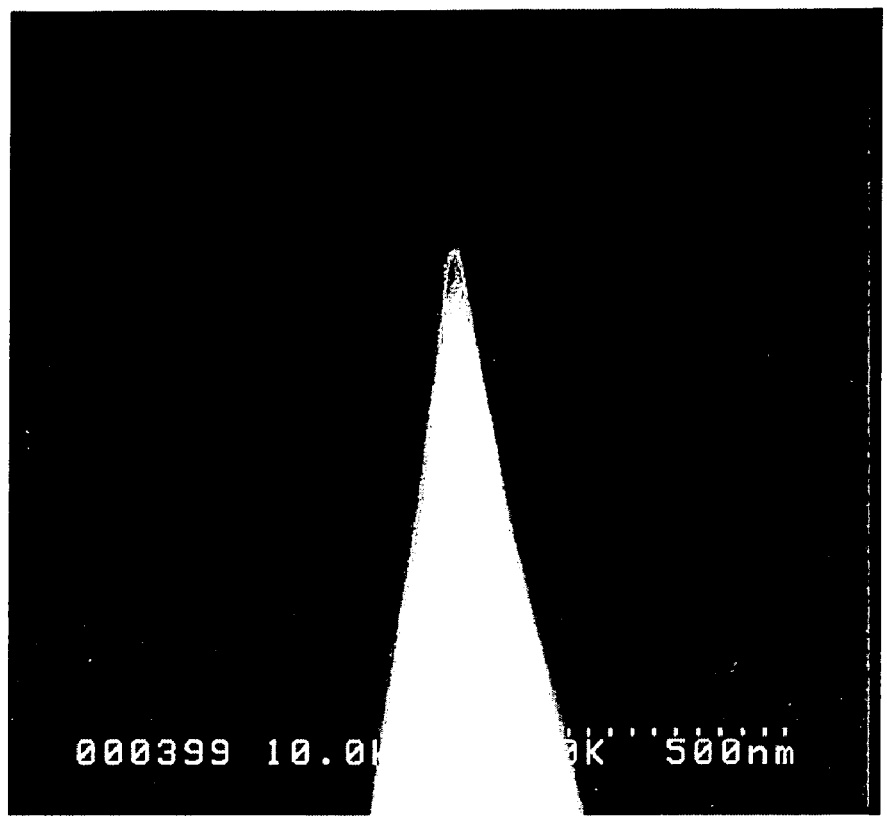
FIGS. 1A-B show scanning electron micrographs (SEM) of individual carbon nanotubules mounted on an atomic force microscope (AFM) tip.
Figure 1B:
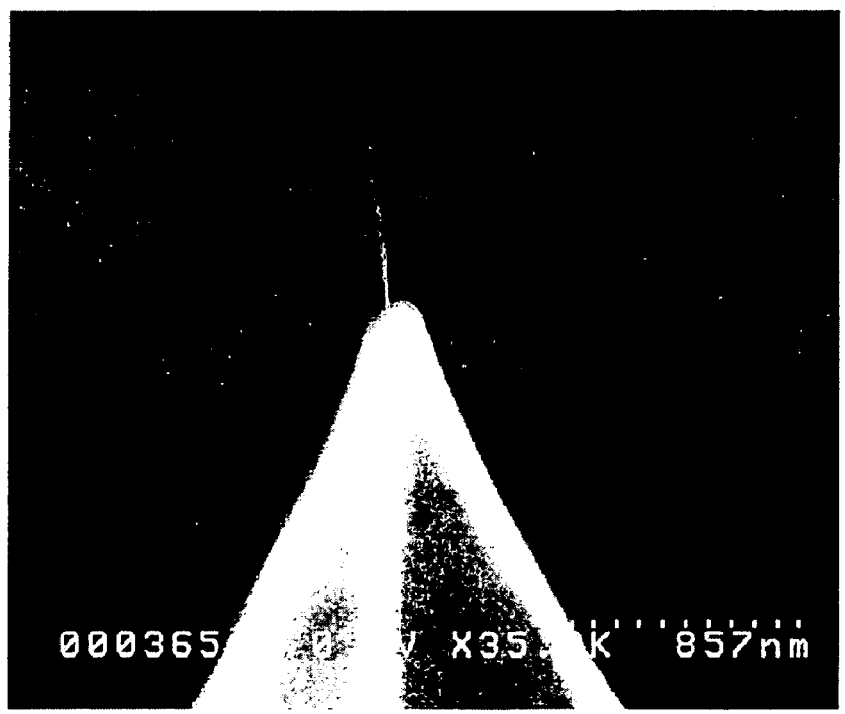

Embodiments in accordance with the present invention exploit the unique molecular recognition capabilities, mechanical and electronic properties, and length scale of carbon nanotubes, to construct molecule-specific actuators and manipulators integrated on scanning probes. These probes can also function as biosensors capable of detecting specific molecules, and sensing changes in (inter)molecular dynamics in combination with fluorescence detection. Interactions between SWNTs and specific biomolecules can be engineered through functionalization of the SWNTs, employing techniques previously developed to construct electronic biosensors based on nanotube transistors.

However, the devices described herein function substantially differently from conventional nanotube-based sensors detecting molecules through electronic transport measurements. In particular, the SWNT probe will serve as a molecular-scale structural support for fabrication of a specific device, through attachment of ligands, enzymes or other biomolecules. Embodiments of devices in accordance with the present invention will induce in biological systems, well-defined biochemical reactions or conformational changes amendable to spectroscopic detection. Fluorescence imaging correlated with one or more of the plurality of data channels an AFM supports, can be used to not only detect and identify single biomolecules, but also to study and eventually control intermolecular dynamics. Electrical conduction through the SWNT can further expand the probe's functional capability.

Conventionally, electronic sensors based on nanotube transistor geometries on planar supports have functioned primarily as static assays. Such conventional devices can sensitively detect and identify specific analytes, but are not intended to interact with or further perturb the sample. By contrast, embodiments in accordance with the present invention are designed to continuously probe a dynamic biological system in real time, and to ultimately influence the organizational evolution and functional capabilities of complex assemblies of individual interacting biomolecules.

Embodiments in accordance with the present invention comprise methods that enable a single active location to be created for sensing or characterization at the free end of a nanotube. This nanotube is attached to a structural substrate that enables the sensor to be very precisely located. The precise location capability enables a wide variety of high resolution studies, characterization and manipulation to be conducted with unprecedented resolution and sensitivity. A typical process of achieving this is outlined in FIG. 2 and described below.

Embodiments in accordance with the present invention start by attaching a nanotube, single-wall, multi-wall or a rope or bundle of single-wall nanotubes to a supporting structure such as an AFM tip. For AFM tips this can initially be accomplished either by direct growth or more preferably by the pickup technique. Once attached this tube can either be adhesively attached to the tip or left attached via van der Waals forces. The adhesives used can vary considerably. The range covers many common water tolerant adhesives such as Norland Optical Adhesive and other UV curable adhesives and even adhesion via metallization, vapor deposited polymers and electrochemical polymerization of coating materials.

In one embodiment, the adhered tip is coated with surfactant and a polymeric material such as PEG to preclude non-specific binding. This coating may be the same material used to increase adhesion of the nanotube to the supporting substrate or separate material or materials used in sequence or combination. The coating can be either chemisorbed or physisorbed onto the tube. For purposes of the instant patent application, the term "chemisorbed" refers to formation of a covalent bond between the nanotube and the coating.

The formation of a covalent bond can alter the electronic properties of the nanotube. In accordance with a preferred embodiment, the coating layer will be physisorbed onto the nanotube. For purposes of the instant patent application, the term "physisorbed" refers to formation of other than a covalent bond between the nanotube and the coating.

Examples of coating to achieve specific purposes include surfactants, polymers, resists, metals, electrochemically deposited metals, polymers, or semiconductors. One or more layers of any of these materials can be applied in succession.

The nanotube tip is then shortened, most commonly through application of a short voltage pulse, to a length suitable as a scanning probe. This length is typically less than 500 nm, and may be less than about 250 nm. In another embodiment, this length is less than about 200 nm and may be less than about 100 nm. In still other embodiments, this length is less than about 100 nm, may be less than 50 nm, and can be as short as about 10 nm.

Application of an electrical pulse, while the coated nanotube tip is in contact or near contact with a grounding substrate, is made to remove coating used to inhibit non-specific binding at the very tip. In one case this material may be a surfactant/PEG solution. This is accomplished through ablation and/or oxidation of the remaining tube end. When performed in an oxidizing environment, the exposed carbon nanotube tip is chemically functionalized with a carboxyl (COOH) group. When performed in a nitriding environment, the exposed carbon nanotube tip is chemically functionalized with an amine ($NH_3$) group.

A specific sensing material can be attached to the end of the nanotube at this unique location. This can be accomplished through covalent chemical bonds to the carboxyl or amine groups at the free end of the nanotube.

Alternately, this attachment can be accomplished via physisorption to the end of the tip. Physisorption could be carried out either by dipping it in the desired material or by touching the end on a very thin deposit of the desired material and lifting off a small deposit at free end of the nanotube. The very thin layer could be created by many commonly known techniques such as spin coating or dip pen lithography.

Alternately, the properties of the nanotube coating material can be electrochemically altered via application of the electrical pulse in different ways than ablation or oxidation, such as reduction. Alternately, several coating of materials could be applied sequentially to gain specific sensing capabilities.

In one specific example of this invention, the adhered nanotube could be coated with metal. In another example of this invention, the nanotube could be coated with several metal layers. In some cases, these metal layers are coated with an insulating material such as a nonconductive polymer. Ablation or oxidation of the end will leave an exposed ring or tip of metal and carbon while protecting the insulating qualities of the assembly.

Differential functionalization is achieved at the free end of the nanotube. It could be achieved through physisorption or chemisorption of a different polymer layer than the initial coating layer or layers. Or it could be achieved by electrochemically altering the coating first applied. Or metal could be localized at tip through resist ablation at tip, metallization, lift-off in acetone, etc. Alternately, the bare tip could be used directly as a nanoelectrode.

Figure 2:
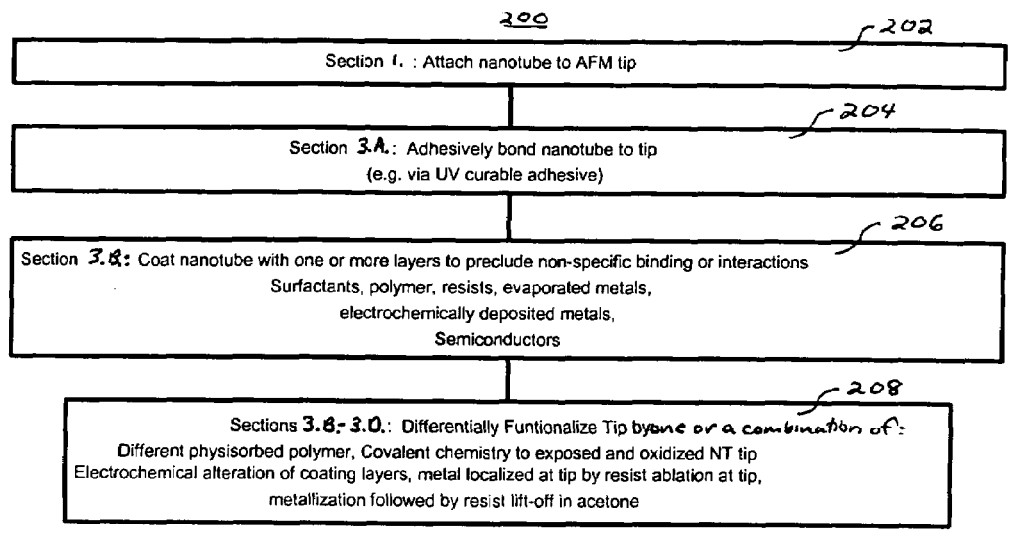
FIG. 2 shows a simplified flowchart of steps of one embodiment of a method in accordance with the present invention.

FIG. 2 shows a simplified flow chart of process 200 employing basic techniques for creating nanoscale or single molecule sensors, manipulators, and devices. In first step 202 described in detail below in Section 1., a nanotube is attached to an AFM tip.

In a second step 204 described in detail below in Section 3.A., a nanotube may be adhesively bound to an AFM tip utilizing UV curable adhesive, epoxy or other adhesive. In a third step 206 described in detail below in Section 3.B., the nanotube may be coated with one or more layers to preclude non-specific binding or interactions with another material, and/or electrically isolate the nanotube from the surrounding environment. Examples of passivating coatings for use in accordance with the present invention include, but are not limited to a surfactant, a polymer, a resist, an evaporated metal, an electrochemically deposited metal, and a semiconductor. In some cases a coating will also serve to increase the adhesion between the nanotube and its supporting substrate.

In a fourth step 208 described in detail below in sections 3.B.-3.D., the tip may be differentially functionalized utilizing a number of techniques, alone or in combination. For example, functionalization may be accomplished through use of (1) different absorbed polymer, (2) covalent chemistry to exposed and oxidized NT tip; (3) electrochemical alteration of coating layers, (4) metal localized at tip by resist ablation at tip; or (5) metallization followed by resist lift-off in acetone.

Figure 11:
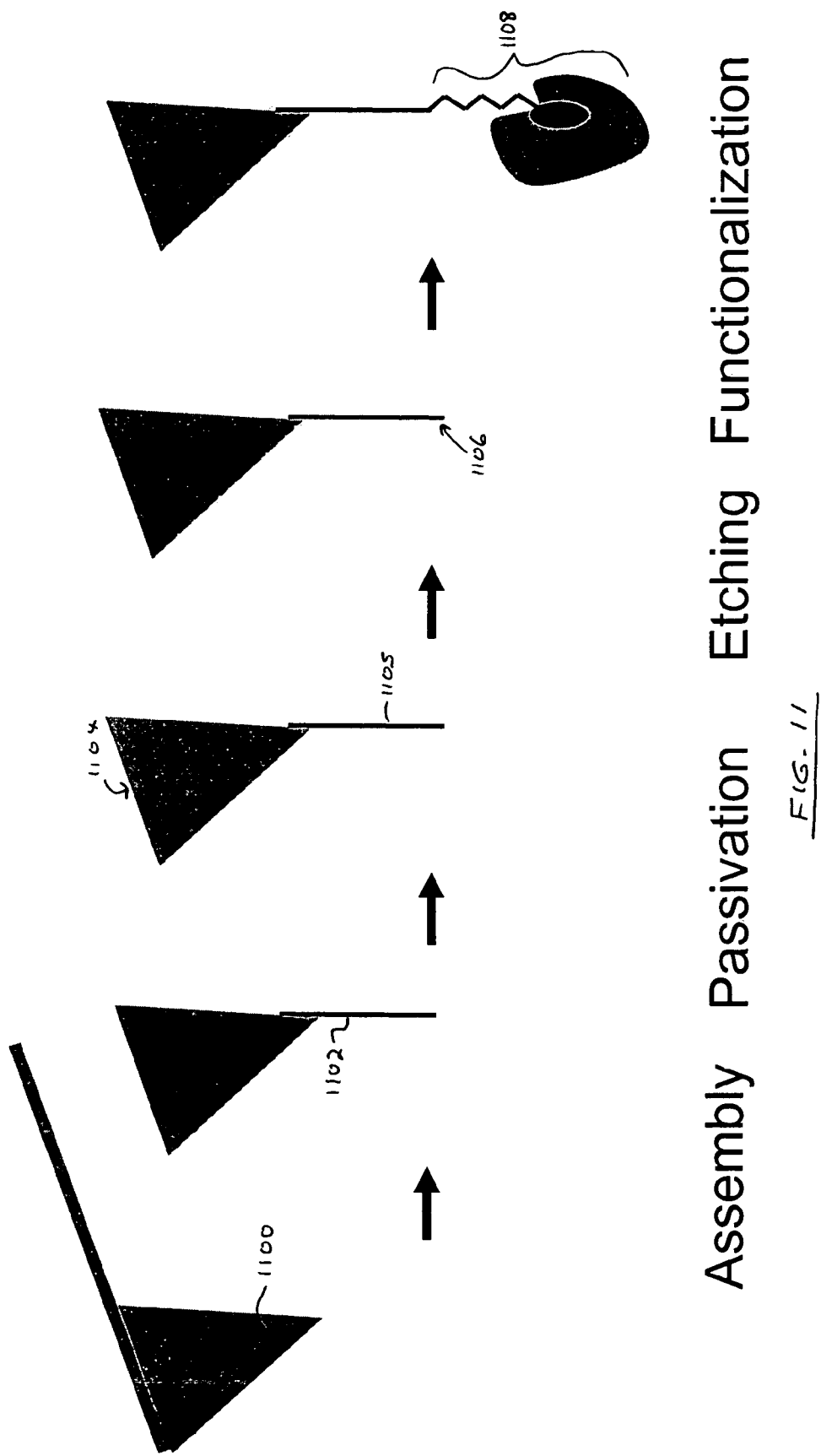
FIG. 11 shows simplified schematic views of the process of wiring biomolecules to carbon nanotube scanning probes.

FIG. 11 shows simplified schematic views summarizing the process of wiring biomolecules to carbon nanotube scanning probes in accordance with embodiments of the present invention. In a first stage, the probe is assembled by causing the AFM tip 1100 to pick up nanotube 1102. In a second stage, the assembled probe 1104 is passivated with material 1105. In a third stage, tip 1106 of the assembled probe exposed by etching. In a fourth stage, the probe is functionalized by interaction between the exposed probe tip and a chemical species 1108. A single sensing assembly comprising one or more molecules is then attached at this uniquely functionalized site and used to probe or sense a variety of samples.

1. "Pick-Up of Individual SWNTs from Flat Substrates

We have found the most success in our labs in following the procedure of growing individual SWNTs on flat surfaces, and using the silicon probe tip to pick up vertically oriented tubes during imaging of these substrates in tapping mode. As described by Wade et al., "Correlating AFM Probe Morphology to Image Resolution for Single-Wall Carbon Nanotube Tips", *Nano Lett*. 10.1021/nl049976q (2004), incorporated by reference herein for all purposes, both the growth conditions of SWNTs as well as the conditions for mounting them on AFM probes with the optimal geometry, are more controllable and better defined with this approach.

Figure 3:
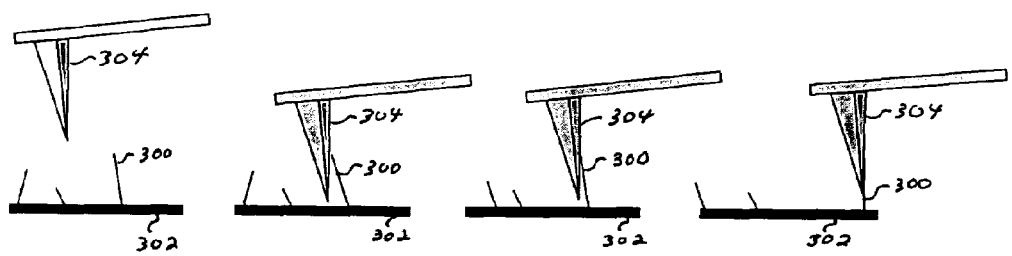
FIG. 3 shows simplified views of pick-up attachment of a single wall carbon nanotube (SWNT) in accordance with an embodiment of the present invention.

FIG. 3 shows a simplified schematic view of the pick-up attachment of SWNTs 300 grown on substrate 302. The asgrown nanotubes can be attached to a scanning AFM probe 304 by van der Waals forces. Once the SWNT has become attached to the AFM tip, the bond between them can be reinforced by gas phase polymerization coating in a plasma reactor, electrochemically deposited coatings, metallization, or curing of a precoated adhesive such as epoxy.

To contrast the relative yield between the pickup and direct catalyst growth methods: in one week we have picked up and shortened 20 SWNT AFM tips to between 10 and 25 nm in length. Estimates for optimal production of direct catalytic tube growth on tips are only 1 useful tip per 2 days, for a dedicated researcher with complete co-located facilities, as described by Wong et al, "Carbon Nanotube Tips: High Resolution Probes for Imaging Biological Systems", *J. Am. Chem. Soc*. 120, 603-604 (1998), incorporated by reference herein for all purposes.

Van der Waals forces between the silicon apex and the picked-up SWNT are believed to hold the nanotube to the tip firmly in air. For imaging in fluids, the silicon pyramidal apex could be pre-conditioned by applying an adhesive to the tip before pick-up followed by curing (with a UV lamp for example). Alternately, evaporative metallization may be an effective tool for strengthening of the attachment site while still preserving the conductive properties of the SWNT tips. Further alternately, plasma deposition of a polymer may be an effective tool for strengthening of the attachment site while still preserving the conductive properties of the SWNT tips.

The primary indication used to tell that a SWNT has been picked up during imaging, is a step change in the Z height. Once a SWNT has been picked up and shortened, the probe can be transferred to a sample for high-resolution imaging, biomolecular manipulations, or force spectroscopy. As evidenced by the large number of SWNTs shown in FIG. 4, the same SWNT substrate can be used thousands of times to prepare SWNT AFM tips easily and reliably.

A. CVD Growth of SWNTs on Pick-Up Substrates

FIG. 12A shows a schematic view of an apparatus 1200 for achieving SWNT catalyzed vapor deposition growth. Growth of SWNTs is carried out by CVD on square 500 μm thick Si/SiO$_2$ wafers 1202 with dimensions between 4 mm and 8 mm.

The wafers are first coated with an iron catalyst by spin-coating at 3000 rpm with 12 drops of a 100 μg/ml solution of Fe(NO$_3$)$_3$.9H$_2$O in isopropyl alcohol. Alternatively, the concentration of Fe(NO$_3$)$_3$.9H$_2$O may range from between about 5-30 μg/ml. Between applications of each drop of catalyst solution, the wafer is spun for several seconds to allow the solvent to evaporate. Catalyst deposition is preferably, though not necessarily, carried out in a clean room.

Alternately, catalyst deposition of metals such as iron, nickel and iron-nickel can be carried out using sputtering, thermal evaporation, molecular-beam epitaxy (MBE). Alternately proteins such as Ferritin can be used to deposit iron catalytic sites uniformly. Alternately nickel-based catalysts can be used on unoxidized silicon substrates.

CVD is performed in a 22 mm inner diameter Lindberg/ Blue M quartz tube furnace 1204 with a heating zone 1205 that is 312 mm long. Five wafers are positioned 12.5 mm apart in a specially designed quartz holder 1206, oriented vertically and with the catalyst coated side facing away from the direction of the incoming gas from sources 1208 regulated by mass flow controller 1210. The most rapid nanotube growth is obtained when the holder is positioned at the leeward end of the quartz tube, with the last wafer approximately 2 mm from the end of the heating chamber/zone.

The quartz tube is then flushed for 15 minutes with argon gas (Matheson, 99.9995% purity, 440 sccm). The furnace is heated at 950° C. for approximately 20 minutes, and then held at 950° C. for 15 minutes, both under a flowing atmosphere of Ar (440 sccm) and H$_2$ (Matheson, research grade, 125 sccm). The furnace is held at this temperature for 5 additional minutes while being flushed with Ar (440 sccm). Growth of nanotubes is then carried out for 1-5 minutes at 950° C. with CH$_4$ (Air Liquide, Ultra High Purity, 1080 sccm) and H$_2$ (125 sccm).

Following this growth step, the furnace is again flushed with Ar (440 sccm) and held at 950° C. before rapidly cooling to less than 250° C., after which the substrates are exposed to air and removed from the furnace. FIG. 12B shows a scanning electron micrograph of SWNTs grown on a pick-up substrate.

This procedure is offered as an example of one of the many which we have used to grow nanotubes. There are many available variations in gas mixture, growth temperature, mass flow rates and procedure step times.

2. SWNT Pick-Up and Shortening Procedure

The growth procedure generates SWNTs on the substrate with diameters ranging from 1.6 to 3.0 nm, and lengths between 100 nm and 5 μm, as imaged with SEM and TEM. Most of the tubes are oriented horizontally with respect to the substrate surface, and can be imaged with standard AFM.

Figure 4:
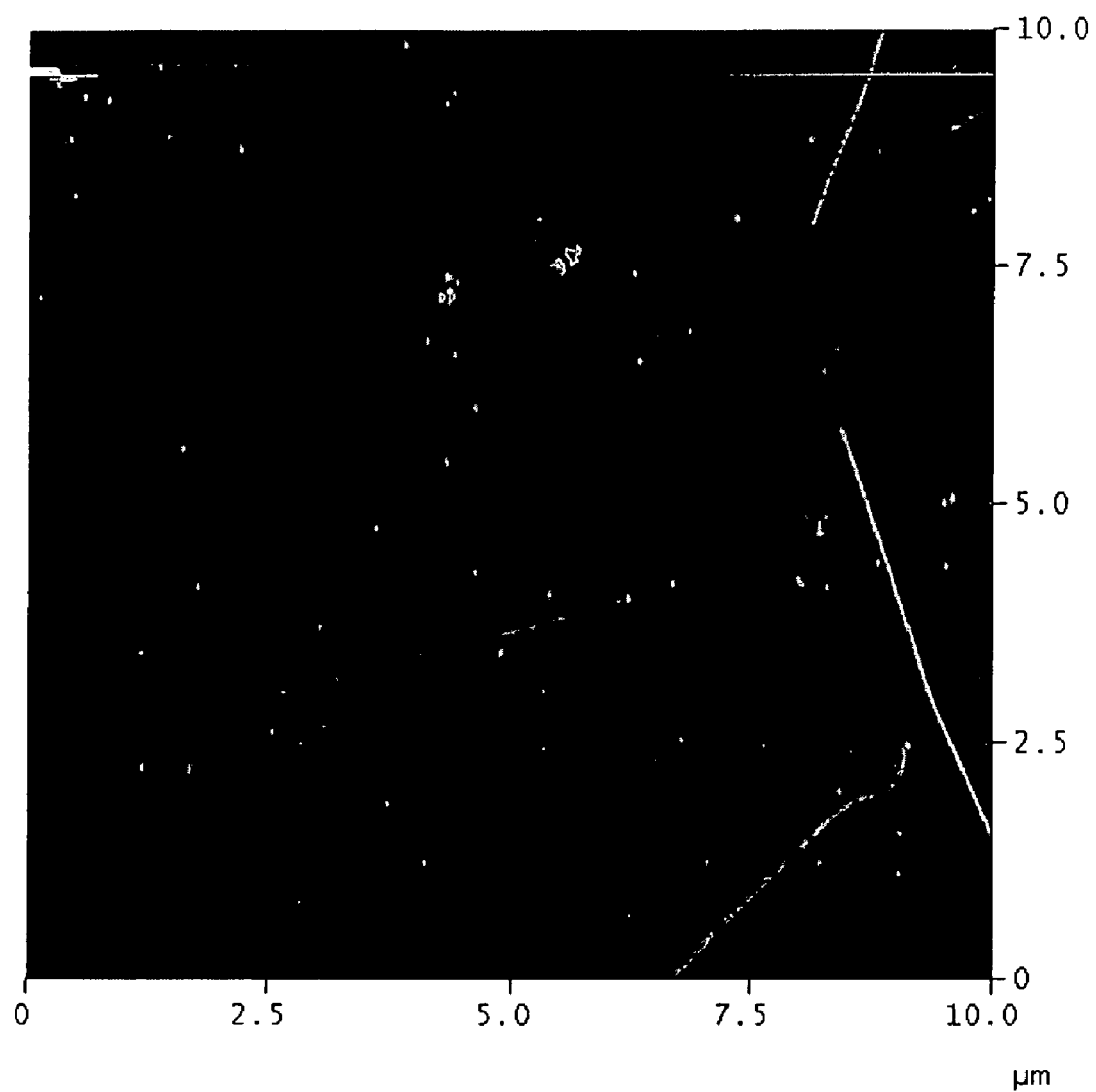
FIG. 4 shows an AFM image of SWNTs grown on a pick-up substrate.

The results from a typical growth are depicted in FIG. 4, which shows a micrograph of SWNTs grown by CH$_4$/ H$_2$CVD on a pick-up (Si/SiO$_2$) substrate. This image, and the force spectroscopy curves displayed below in FIGS. 5A-B were taken with a MultiMode AFM instrument in Collier's lab, controlled by a Nanoscope IV controller, both from Digital Instruments of Santa Barbara, Calif.

A small percentage of tubes are oriented vertically, and can be picked up by scanning the AFM cantilever across the surface. Typically, 1 to 4 tubes can be picked up from a 10 µm×10 µm square region. The tube binds to the side of the pyramidal AFM tip through Van der Waals attractive forces, and usually remains attached firmly enough that it can be repeatedly pressed into or scanned across the substrate surface. The pick-up of a nanotube is readily observed by monitoring the Z height while looking for a significant step change in the average position.

In almost all cases, more than 100 nm of nanotube protrudes from the end of the AFM tip, making high resolution imaging impossible due to thermal fluctuations and bending without first shortening the tube to lengths between 10 and 100 nm for a 2 nm diameter SWNT. The length of the nanotube protruding from the end of the AFM tip can be measured indirectly by observing the oscillation amplitude and deflection of the cantilever as it is brought into contact with a hard surface.

Consider first the profile of a bare tip in contact with a substrate. As the approaching tip begins to interact with the surface, the oscillation amplitude decreases quickly, reaching zero when the tip is in full contact. At this point of contact, the cantilever deflection signal begins to rise linearly as the tip is pressed further into the surface.

Figure 5A:
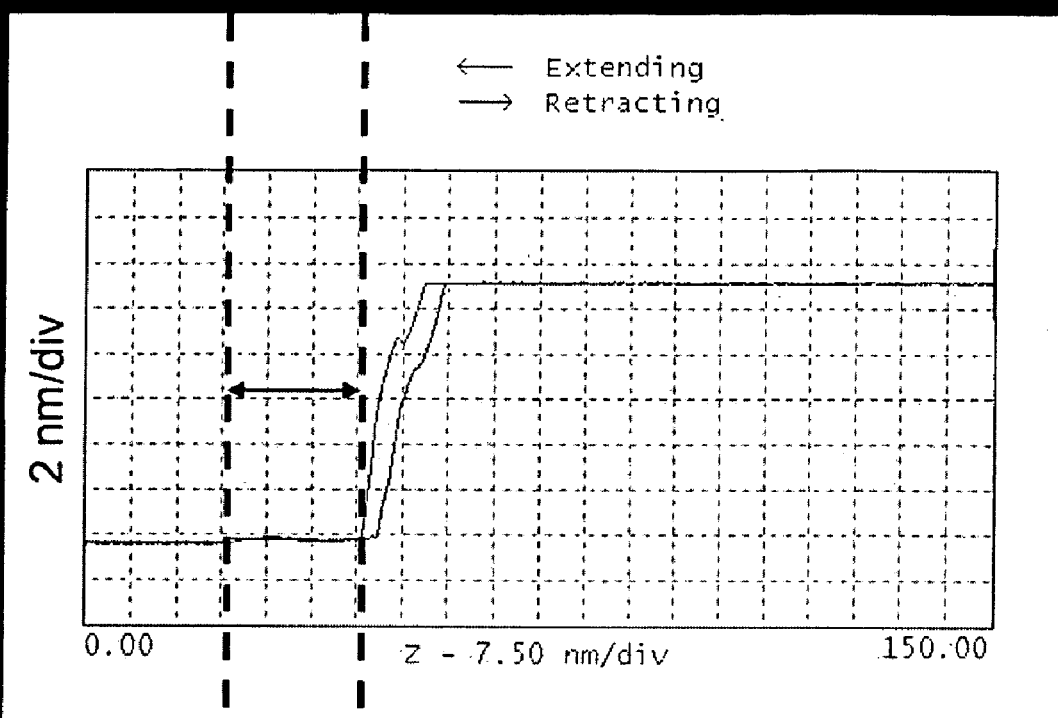
FIG. 5A plots an oscillation amplitude signal for an AFM tip for a shortened SWNT.
Figure 5B:
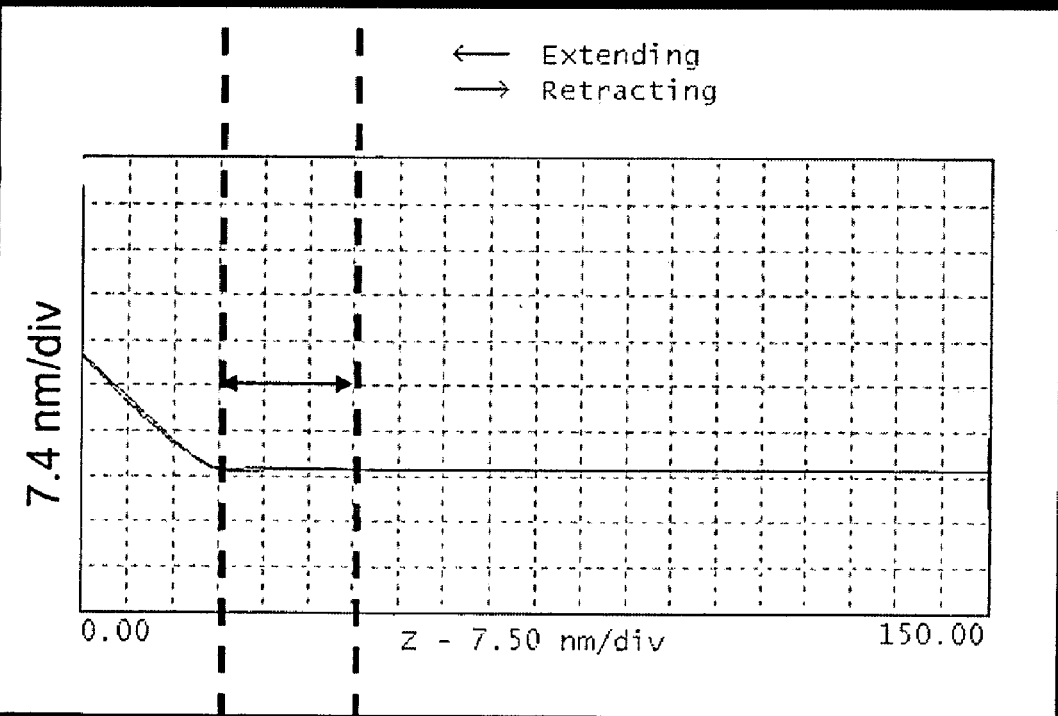
FIG. 5B plots a cantilever deflection signal for an AFM tip for the shortened SWNT of FIG. 5A.

A tip with a protruding nanotube will show a different profile, as depicted in FIGS. 5A-B, which plot oscillation amplitude and cantilever deflection signals, respectively, for an AFM tip with a SWNT shortened to about 22 nm. In FIGS. 5A-B, the length of the tip is depicted by the length between the two vertical dashed lines.

The oscillation of the tip undergoes rapid damping as soon as the nanotube makes contact with the surface. However, the SWNT buckles elastically at higher loads and does not deflect the cantilever.

Only when the rigid Si tip apex itself makes direct contact with the substrate is the deflection detected. The distance between the point at which the oscillation amplitude decreases to zero and the point at which the deflection of the cantilever is detected indicates the protrusion length of the nanotube. In this region, the tube is elastically bending or buckling, which is reversible: when the probe is retracted, the buckled tube can reform to its original shape.

Figure 6:
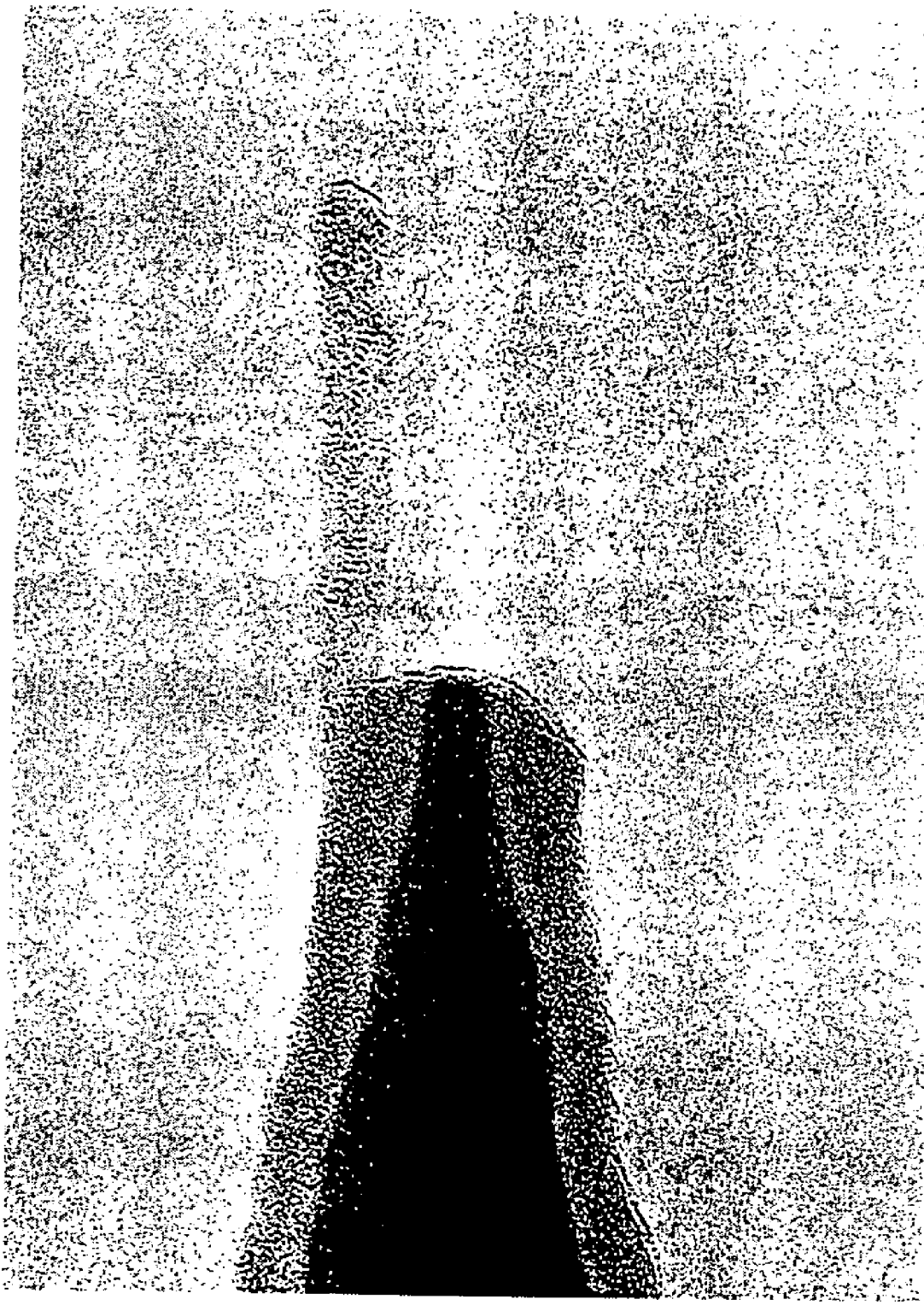
FIG. 6 shows a transmission electron micrograph of a shortened nanotube at the end of an AFM cantilever tip.

FIG. 6 shows TEM image of shortened nanotube at the end of a silicon AFM cantilever tip. This tip was attached via the pickup method and shortened to 65 nm using electrical pulses as described above. The diameter of this tip is approximately 6 nm. Due to the structure at the end of the nanotube and the angle at which it is mounted relative to the surface, it images with a resolution of approximately 3 nm.

The procedure to shorten the SWNT in air comprises applying +3 to +50 volt pulses of 20 to 100 µs duration between the AFM tip and a grounded, conductive silver substrate. These pulses are supplied from a Hewlett-Packard 8114A pulse generator and routed to the tip through a Digital Instruments Signal Access Module, or "break-out" box, which is connected to the MultiMode AFM. Presumably the nanotube is shortened by ablation resulting from the very high electric field generated at the nanotube end. The pulses are applied while tapping the surface at approximately 70-300 kHz, which is near the resonance frequency of the cantilever.

For a given SWNT tip, larger voltage pulses shorten the tube in larger increments, as do pulses of longer duration. But the voltage necessary to carry out shortening varies drastically between individual tubes. This is believed due to the widely varying conductivities associated with nanotubes of slightly different molecular structure, for example, between semiconducting and metallic nanotubes.

Nanotubes can be shortened precisely with steps as small as 2 nm per pulse. The main drawback to this technique is that the electrical pulsing can dislodge the nanotube electrostatically from the AFM tip. However, this effect can also be exploited to controllably deposit nanotubes precisely on substrates for device fabrication.

Figure 7B:
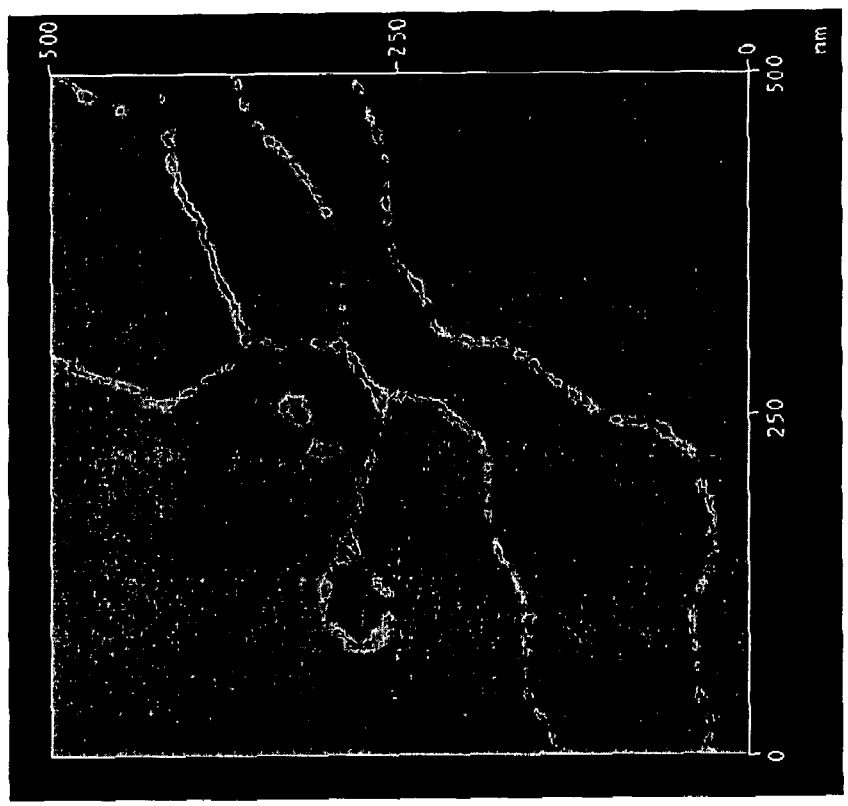
FIG. 7B shows an AFM image of DNA on mica, taken using shortened pick-up nanotube tips.
Figure 7A:
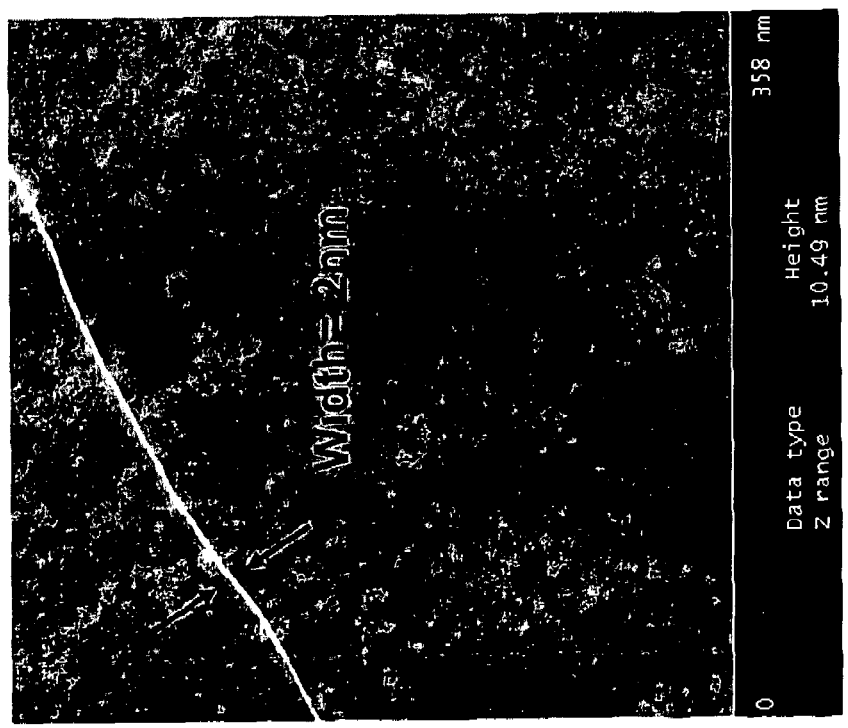
FIG. 7A shows an AFM image of SWNTs on an oxidized silicon substrate, taken using shortened pick-up nanotube tips.

FIG. 7A shows AFM images of SWNTs on oxidized silicon substrate taken using a shortened pickup nanotube tips grown by our team. The SWNT AFM images seen in FIG. 7A determine the equivalent resolution that we have been able to obtain so far to be 0.5 nm.

The resolution is defined as being the difference between the measured height of the cylindrical nanotube and the width at the noise floor. In this case the 1.6 nm diameter nanotube was measured to have a 2.1 nm width at the noise floor. Hence the very conservative estimate of 0.5 nm resolution. Typical silicon tips are 10-30 nm in diameter. AFM resolution in the X-Y plane is proportional to the tip radius. The resolution seen here is ~20-30 times better than can be achieved with a conventional silicon tip.

FIG. 7B shows AFM images of DNA on mica taken using a shortened pickup nanotube tips grown by our team.

3. Functionalization of SWNT AFM Probes

A. Adhesion of Picked-Up SWNT to AFM Tip for Operation in Liquids

If necessary, the silicon apex of the AFM tip can be pre-coated with a very thin layer of an adhesive (for example Norland Optical Epoxy Number 60) before picking-up a SWNT from the growth substrate. This involves bringing the AFM cantilever assembly mounted on a XYZ micromanipulator into contact with a very thin layer of adhesive. The neck of a drawn-out filament from a bead of epoxy coated on a wooden applicator has been found to be a sufficiently thin coating. The process is performed under 10× to 110× magnification in a stereo zoom microscope.

Once a SWNT has been picked up from the substrate by the scanning AFM, the adhesive is cured. In the case of the Norland optical adhesives, this is accomplished with a UV lamp. The bulk resistivity of the optical epoxies is high but the layer can be thin enough to allow sufficient electrical contact between the silicon AFM tip and the nanotube.

Other adhesives, with lower resistivities, will enable improved electrical contacts to be achieved. Curing of the adhesive can be accomplished either after pickup and before pulse shortening, or after pickup and shortening are completed. Alternatively, polymer or metal coatings can be applied after pickup to improve adhesion.

B. General Description of Differential Functionalization of SWNT Tips

Figure 8:
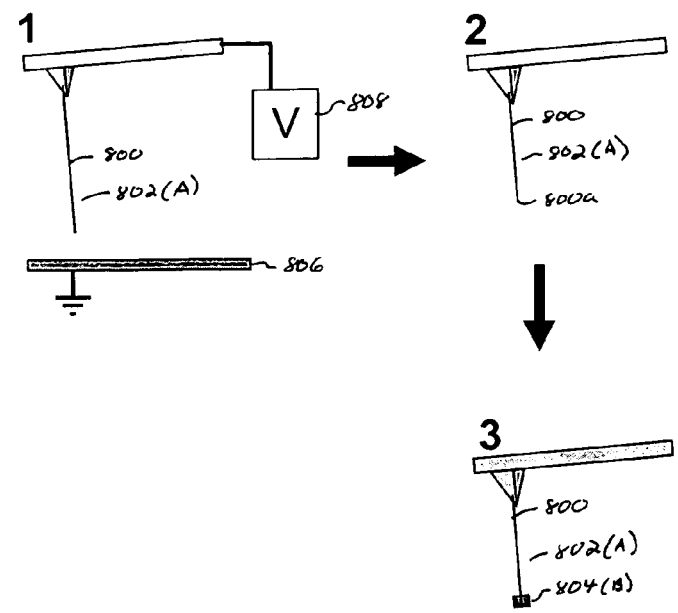
FIG. 8 shows simplified views of a basic process flow for unique functionalization of the free end of a SWNT.

The as-grown SWNT can be coated with one, two, or many different materials depending on the specific embodiment envisioned. FIG. 8 shows a simplified schematic view of the basic process flow for unique functionalization of the free end of a nanotube 800. The process starts with coating with a material 802 that inhibits non-specific binding. In the second step, an electrical pulse is then used to ablate or vaporize the end of the tube exposing the tip 800a. The tip can then be uniquely functionalized, as shown in the third step.

In the embodiment shown schematically in FIG. 8, the process uses a single initial coating, A, (802) which can then be modified with the application of a potential difference between the AFM tip and the scanned surface to give coating layer B, (804) having fundamentally different chemical, biological and/or physical characteristics. Depending on the particular embodiment, the voltage may be of any magnitude, polarity and duration. In the embodiment shown in FIG. 8, the probe tip is positively charged relative to grounded conductive substrate 806 as a result of connection with voltage pulse generator 808.

The high electric field density between the SWNT tip and the surface will localize the physical extent of layer B to, at most, a few nanometers from the resulting tip end. Specific examples of changes in the characteristics of layer B relative to layer A will depend on the details of the specific embodiment envisioned and may result from procedural steps carried either before, during or after the application of the electrical potential.

The role of the electrical event in any process will be to either ablate material from the tip of the SWNT probe, possibly including but not limited to the nanotube core, or electrically/electrochemically change the nature of the initial coating formulation at the tip relative to the rest of the tube due to the vastly increased density of electric field lines emanating from the sharp tube end.

The modification will involve charge injection at the region of modification, and may or may not be accompanied by measurable electrical current. The electrical modification process may be monitored in real time by correlating measurements of the voltage difference between tip and surface or current flow between the two, with observation of tip oscillation amplitude or tip deflection similar to the description of tube shortening in section 2 above.

C. Specific Embodiments of SWNT Functionalization and Applications

Figure 9:
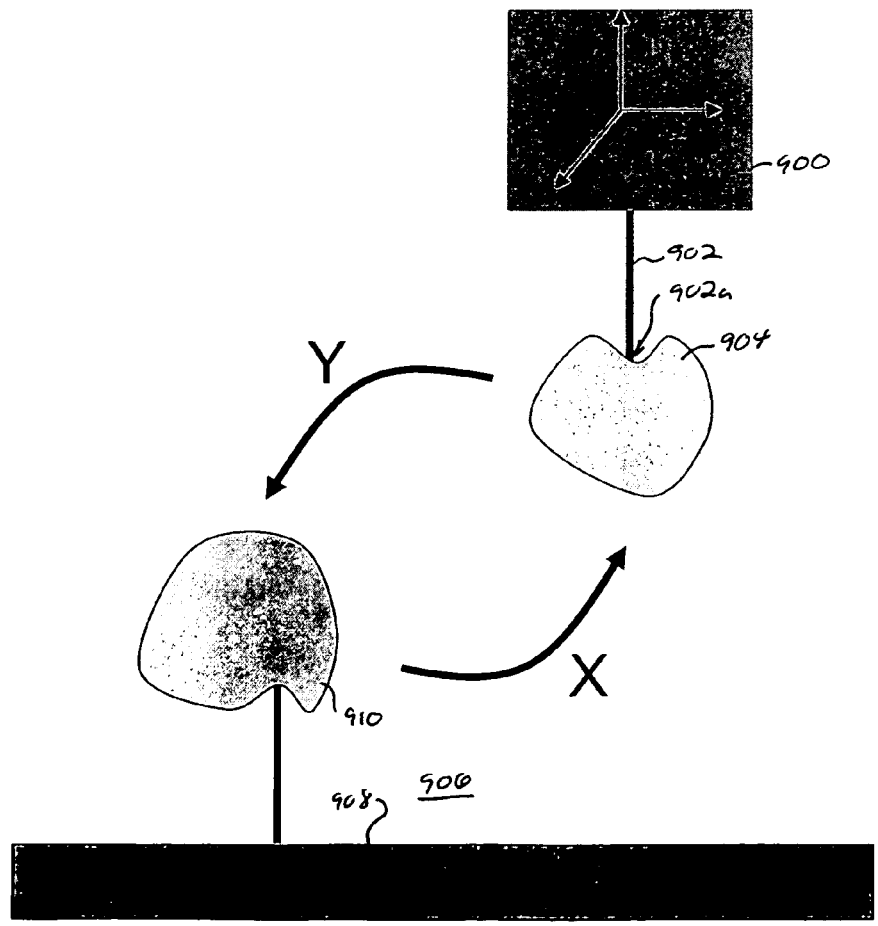
FIG. 9 shows a simplified schematic view of control over biomolecular dynamics on the molecular scale.

In one general class of modifications, SWNTs attached to AFM probes can be functionalized to serve as single molecule manipulation and sensing devices. FIG. 9 shows a simplified schematic view of such an embodiment, wherein AFM probe 900 includes nanotube 902 functionalized to bear molecule 904 at its tip 902a. AFM tip 900a may be translated along the x-, y-, or z-axes to bring molecule 904 into proximity with environment 906 (here represented as surface 908 bearing feature 910). Based upon interaction (X/Y) between the probe and the environment, control of biomolecular dynamics at the molecular scale may be accomplished utilizing techniques such as single-molecule manipulation, single-molecule fluorescence, or electrochemical triggering of biochemical reactions. In addition, kinetics of chemical or biological activities may be either monitored, controlled, triggered, or catalyzed by such devices.

Figure 10:
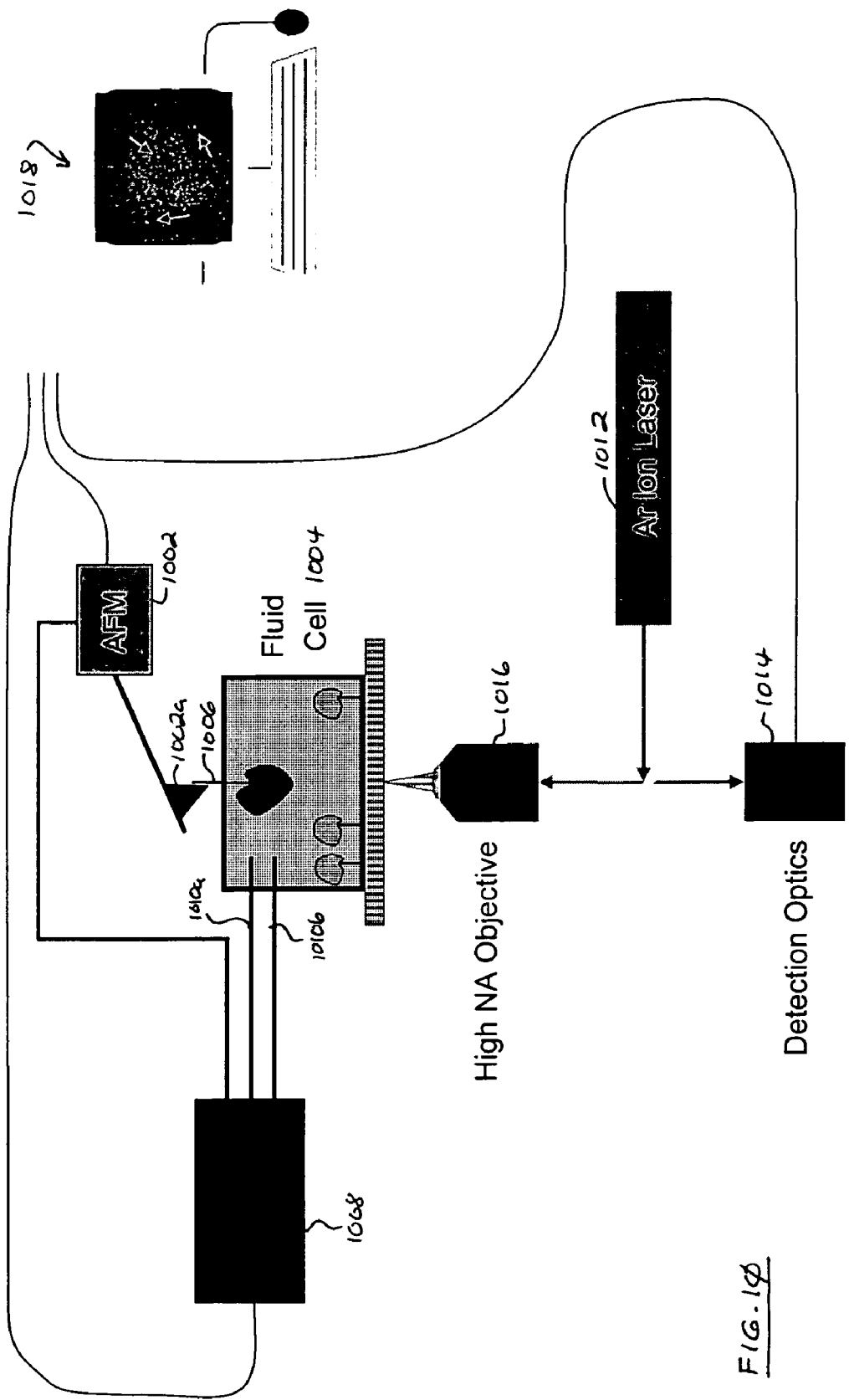
FIG. 10 shows a simplified schematic view of a hybrid AFM/optical microscope apparatus allowing manipulation of functionalized SWNTs.

FIG. 10 shows a simplified schematic view of one embodiment of a hybrid AFM/optical microscope utilizing functionalized SWNTs. Device 1000 comprises atomic force microscope (AFM) 1002 having probe 1002a, in fluid communication with fluid cell 1004. Probe 1002a bears nanotube 1006 bearing functionalized end 1006.

Fluid cell 1004 is in electronic communication with potentiostat 1008 through electrodes 1010a and 1010b. Fluid cell 1004 is in optical communication with light source 1012 (e.g. an Ar Ion laser) and detection optics 1014 through high NA objective 1016. Computer 1018 is in electronic communication with the AFM, potentiostat, and detection optics.

Such SWNTs attached to AFM probes can be functionalized as single molecule manipulation and sensing devices using a three-step procedure.

A first step involves initial coating to ensure that non-specific binding is inhibited. In certain embodiments, the initial coating step on the SWNT may take place while the tube is still on the growth substrate, before it is picked up by the AFM tip.

An initial coating formulation that has been shown to effectively resist non-specific binding of molecules such as proteins to SWNTs involves co-adsorption of a neutral surfactant such as Triton-X 100 and PEG. Triton is surfactant containing a hydrophobic aliphatic chain, terminated by a short hydrophilic PEG group. Binding of Triton to SWNTs is favorable due to hydrophobic interactions and has been a well-used method for preparing stable suspensions of SWNTs in aqueous solutions.

Like many other polymers, PEG can be irreversibly adsorbed onto SWNTs. However, coating of SWNTs by Triton-X or PEG alone does not result in complete passivation of the SWNT; both materials are needed for uniform passivation of the nanotube.

Figure 13A:
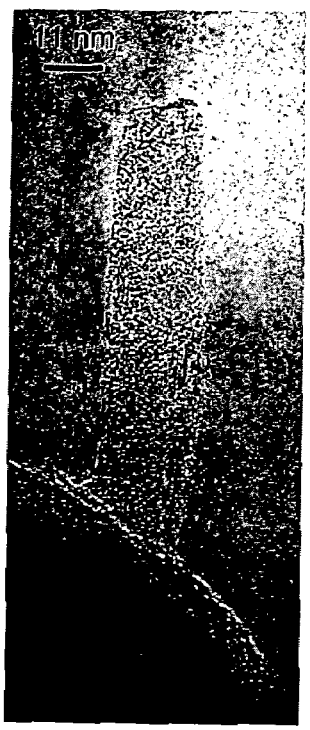
FIG. 13A shows an electron micrograph of a nanotube probe passivated by an electrochemical polymerization process.

Alternatively, or in conjunction with forming passivation through exposure to surfactant(s), a passivation layer can be formed over a SWNT utilizing an electrochemical polymerization process. In accordance with one embodiment of the present invention, a SWNT may be passivated with a phenylenediamine polymer resulting from electrochemical oxidation of phenylenediamine monomer. FIG. 13A shows an electromicrograph of a SWNT passivated in this manner.

Figure 13B:
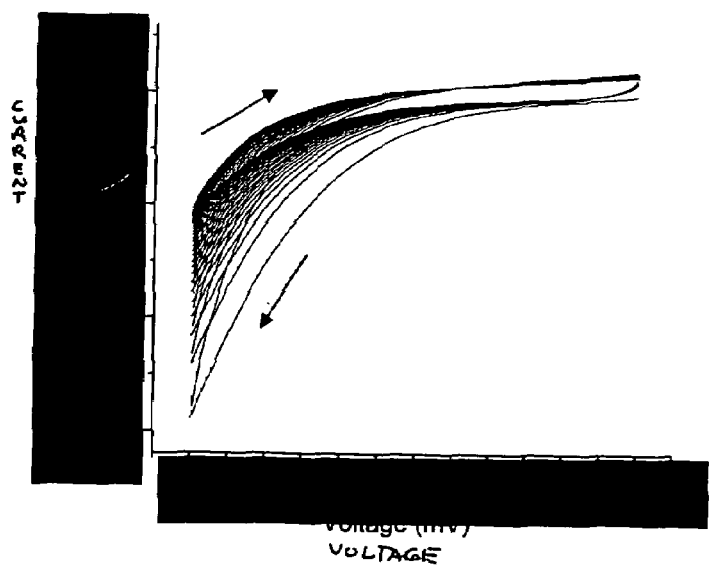
FIG. 13B plots current versus voltage to illustrate the passivation by electrochemical polymerization, of the nanotube probe of FIG. 13A.

FIG. 13B is a cyclic voltammetry plot taken during formation of the passivated SWNT shown in FIG. 13A. The reduced current (y-axis) at later cycles reveals the reduction in conductivity of the SWNT, and hence the thickness/strength of the passivation layer formed.

Figure 14A:
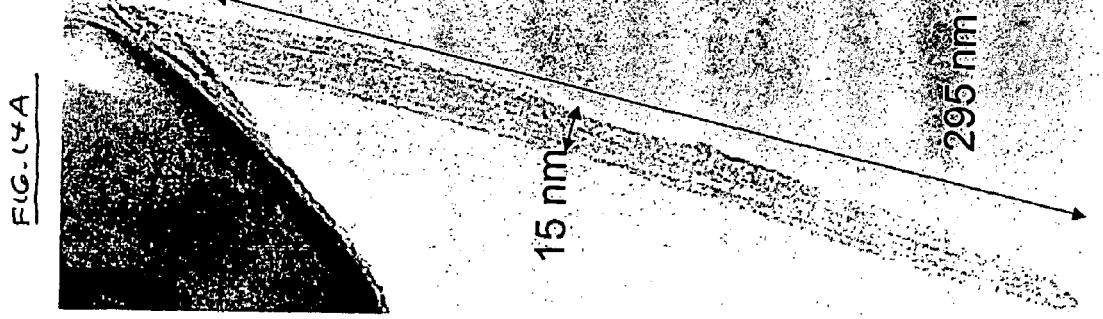
FIG. 14A shows an electron micrograph of a nanotube probe passivated by gas phase polymerization in an inductively coupled plasma.

Moreover, passivation of a SWNTs is not limited to exposure to surfactants or electropolymerized materials as just described. In accordance with still other alternative embodiments of the present invention, a passivation layer may be deposited by gas phase polymerization. FIG. 14A shows an electron micrograph of a nanotube probe passivated by gas phase polymerization in an inductively coupled $C_4F_8$ (octofluorocyclobutane) plasma, to form a Teflon-like layer on the nanotube.

Figure 14B:
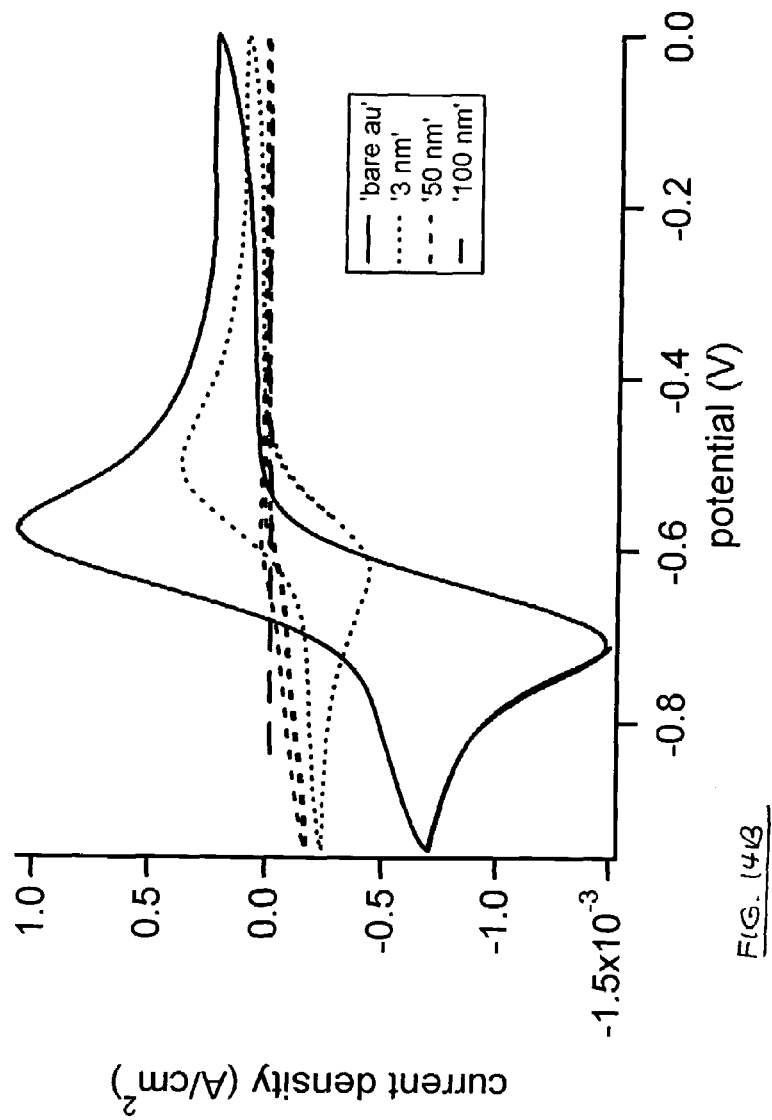
FIG. 14B plots current density versus potential for such a Teflon-like polymer film formed on gold electrodes by the same type of gas-phase reaction responsible for forming the passivation layer on the SWNT shown in FIG. 14A.

FIG. 14B plots current density versus potential for such a Teflon-like polymer film formed on gold electrodes by the gas-phase reaction of $C_4F_8$. The insulating properties of FIG. 14B were determined by measuring the current involving the oxidation of ruthenium (II) hexaammine:

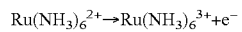

as a function of film thickness in an electrochemical cell. Similar behavior was observed with graphite electrodes.

Figure 14C:
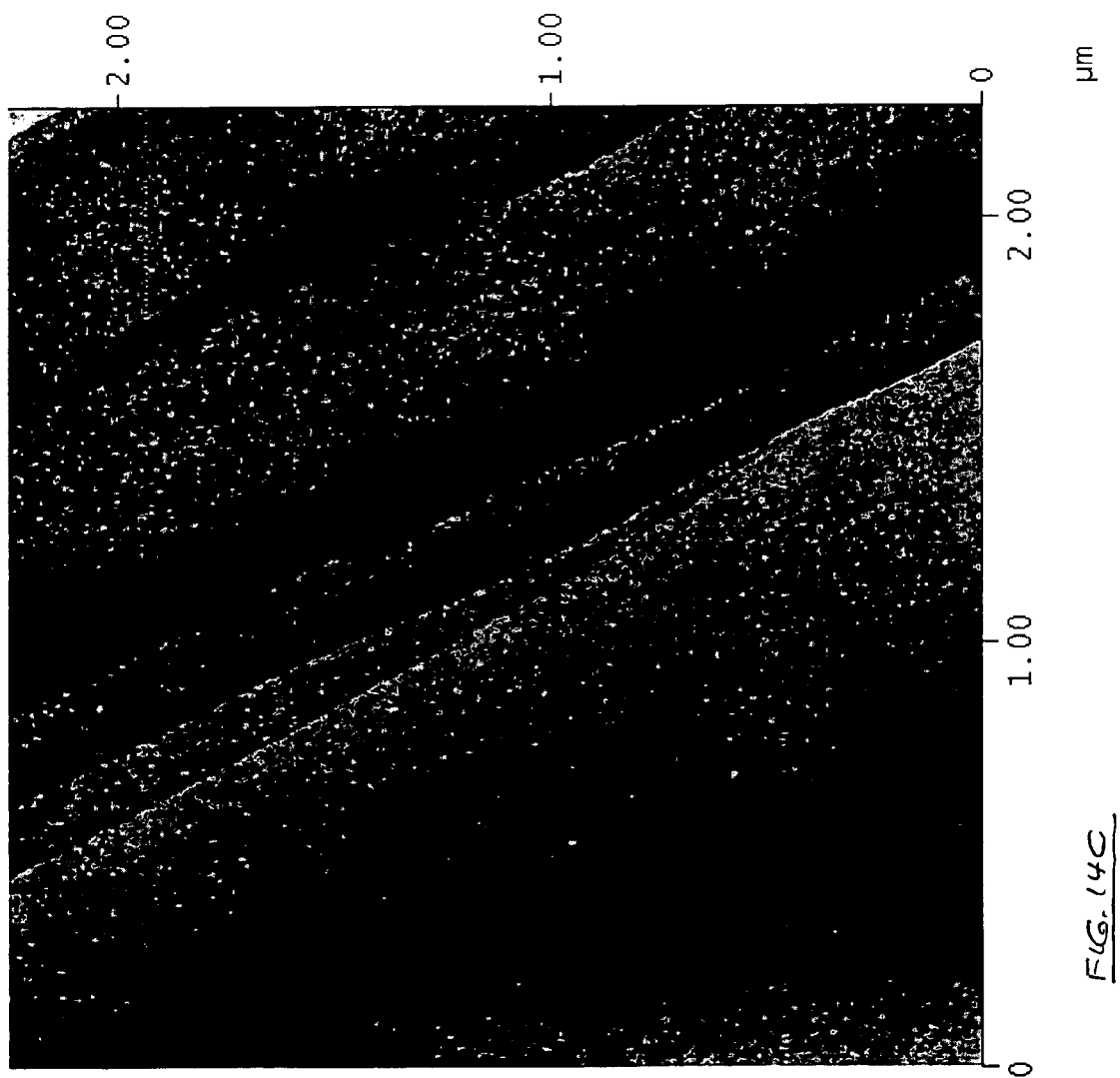
FIG. 14C shows an AFM image of a planar graphite substrate coated by a Teflon-like polymer film formed by the same type of gas-phase reaction responsible for forming the passivation layer on the SWNT shown in FIG. 14A.

FIG. 14C shows an AFM image of a planar, highly oriented pyrolytic graphite (HOPG) substrate coated a Teflon-like polymer film formed by the same type of gas-phase reaction responsible for forming the passivation layer on the SWNT shown in FIG. 14A. The thickness of the deposited polymer film is 3 nm. FIG. 14C shows the conformal nature of the coating, as the polymer layer closely follows the step edges.

Figure 14D:
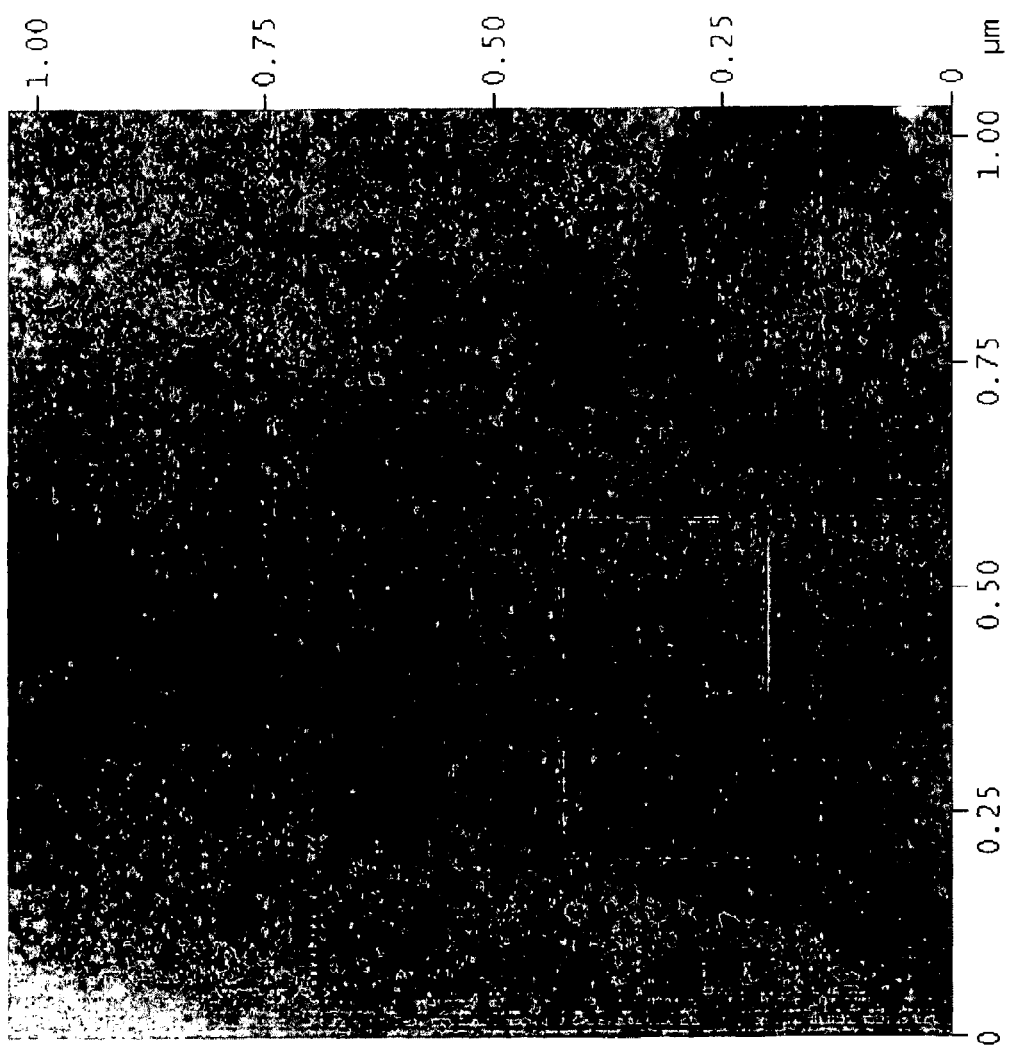
FIG. 14D shows a roughness analysis of the substrate whose AFM image is shown in FIG. 14C.

FIG. 14D shows a roughness analysis of the substrate whose AFM image is shown in FIG. 14C. Root-mean-square (rms) roughness in the boxed region is 0.238 nm. FIG. 14D shows that polymer coating is very smooth. Step edges in the graphite are clearly identifiable, indicating that coating is conformal.

The various techniques for forming coatings just described, may be employed alone or in combination. Thus formation of a coating by gas phase deposition of a polymer, in the presence or absence of a plasma, may be performed in conjunction with surfactant exposure.

A second step of functionalizing such SWNTs attached to AFM probes involves removing or modifying this inhibiting coating at the free end of the nanotube, typically through application of an electrical pulse. In one set of embodiments, this passivating coating is removed at the free end of the SWNT by ablation from the electrical pulse.

The exposed free end of the SWNT could be left uncoated, and serve as a scanning probe nanoelectrode. The nanoelectrode could function as an amperometric electrode or as a potentiometric electrode.

The nanoelectrode device would be useful in single molecule electrochemical studies, including but not limited to use in a novel scanning patch clamp apparatus for measuring and/or stimulating ion channel, G-coupled protein receptors, or other transmembrane protein activity, both in in vitro reconstituted systems as well as in cells. This probe could be brought within the Debye length (~10 Å) of a protein like an ion channel, enabling one to measure local currents and/or electrical potentials at and in the vicinity of single ion channels.

New bioelectrochemical experiments can be envisioned utilizing such nanoscale scanning probes in accordance with embodiments of the present invention. Such applications include but are not limited to the detection, or production via reduction-oxidation chemistry, of physiologically active ligands, such as hormones, neurotransmitters, nucleotides and peptides as a function of electrode potential.

Figure 15:
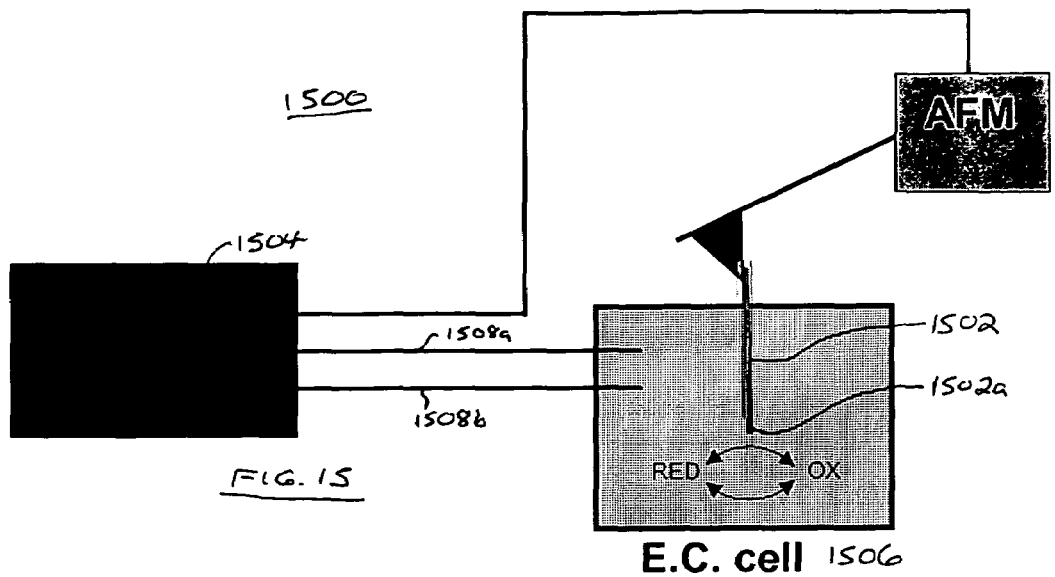
FIG. 15 shows a simplified view of the use of a SWNT probe in connection with a localized electrochemical reaction.

FIG. 15 shows a simplified view of apparatus 1500 utilizing an uncoated tip 1502a of a SWNT 1502 as a probe for detecting a localized electrochemical reaction. By utilizing potentiostat 1504 to measure a changed voltage on SWNT 1502, the electrochemical environment within cell 1506 could be monitored on a highly localized level.

Apparatus 1500 of FIG. 15 could also be utilized to influence or trigger an electrochemical reaction on a highly localized scale. Specifically, application of electronic energy in the form of a potential or current to the SWNT, would create an electric field at the exposed end of the SWNT structure.

In one approach, the changed electrical environment resulting from the application of electrical energy from the exposed SWNT tip, could be detected by electrodes 1508a and 1508b present in cell 1506 and in direct communication with potentiostat 1504. However, the small amount of voltage applied in an extremely small area may render detection in this manner difficult or unfeasible.

Alternatively, the successful application of electrical energy to a localized environment may be detected indirectly through electrochemical luminescence. Consider the following electrochemical reaction sequence:

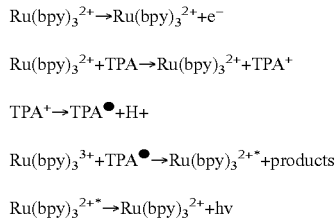

$Ru(bpy)_3^{2+} \rightarrow Ru(bpy)_3^{2+} + e^-$ $Ru(bpy)_3^{2+} + TPA \rightarrow Ru(bpy)_3^{2+} + TPA^+$ $TPA^+ \rightarrow TPA^\bullet + H+$ $Ru(bpy)_3^{3+} + TPA^\bullet \rightarrow Ru(bpy)_3^{2+*} + products$ $Ru(bpy)_3^{2+*} \rightarrow Ru(bpy)_3^{2+} + h\nu$ The probes may also produce electrochemiluminescence. Oxidation of ruthenium bipyridine by the probe in the presence of a primary alkyl amine (such as tripropylamine) results in the formation of electronically excited triplet-state ruthenium bipyridine, which phosphoresces to the ground electronic state. Since this approach involves the detection of photons in a zero-background experiment, it may be more sensitive than measuring ultra-small electrical currents directly.

A third step in the functionalization of SWNTs attached to AFM probes involves attaching material, either through a covalent or non-covalent process, that enables specific interaction or binding at that fixed location.

As described in connection with the second step, the SWNT tip of the probe could be freed from passivation through the application of electrical energy. Such electrical pulsing in air also results in functionalization of the remaining end of the carbon nanotube with one or more carboxylate groups (—COOH).

Pulsing in other gases than air, such as $H_2$ or $N_2$, will introduce different functionality to the carbon nanotube end, allowing for an expansion of possible chemical coupling techniques.

Covalent coupling chemistry of the carboxylate moiety with reactive amino species, with EDC (1-ethyl-3-(3-dimethylaminopropyl) carbodiimide) as a catalyst, allows for the covalent attachment of many types of organic and biological species via formation of amide bonds. Examples of molecules attached in this way include but are not limited to DNA, proteins and fluorophores. Photo-activated or "caged" molecules, such as those presenting groups like benzophenone, could also be attached for light-directed capture of target molecules.

Alternately, the free end may have a different polymeric material adsorbed to it, with specific functionality for attachment of molecules of interest. For example, derivatives of PEG containing amino groups, thiol groups, cyano groups, biotin, or antibodies may be uniquely physisorbed at the free end to capture specific molecules in a complex sample.

Alternately, lower voltages or currents may be used to electrochemically modify a redox-active polymer, polyelectrolyte or self assembled monolayer (SAM) at the tube end to change its physical and chemical properties and affinity for specific analytes, either reversibly or irreversibly, but without destruction of the coating.

Alternately, an initially neutral coating at the tip may be electrically charged by application of the pulse, for electrostatic attraction of molecules. Examples of materials that could be used in this regard include, but are not limited to, polyaniline and polypyrrole and self assembled monolayers comprised of ferrocenyl thiols.

Alternately, a photoactive conjugated polymer, such as PmPV [poly{(m-phenylenevinylene)-co-[(2,5-dioctyloxy-p-phenylene)vinylene]}] or PPyPV [poly{(2,6-pyridinylenevinylene)-co-[(2,5-dioctyloxy-p-phenylene)vinylene]}] could be adsorbed. SWNTs wrapped with these polymers have shown interesting photogated effects on charge transport, including rectification and amplification of current flow.

These optoelectronic effects were pH dependent. A scanning probe fabricated with such material may serve as a nano-pH electrode.

Embodiments in accordance with the present invention may allow observation and even electrochemical control over single enzymatic reactions, allowing monitoring of fluorescence from a redox-active cofactor or the formation of fluorescent products. Enzymes "nanowired" to the tips of carbon nanotubes in accordance with embodiments of the present invention, may enable extremely sensitive probing of biological stimulus-response with high spatial resolution, including product-induced signal transduction.

In accordance with certain embodiments, covalent attachment of electrically active or fluorescent species such as some redox-active enzymes or cofactors used by these proteins to a functionalized SWNT nanoelectrode, could be used to study the effect of charge injection on enzyme activity. Analogous macroscopic electrode systems containing electronically coupled enzymes such as glucose oxidase are well known. For example, in "Plugging into Enzymes: Nanowiring of Redox Enzymes by a Gold Nanoparticle", Science 299, 1877-1881 (2003), Xiao et al. showed that by quickly changing the potential applied to their "nanowired" electrode from 0 V to 0.7 V, glucose oxidase could be switched from an enzymatically inactive state to an active one.

In accordance with embodiments of the present invention, application of electrical potentials to functionalized SWNT probes will permit electrochemical control over individual redox events occurring during enzymatic turnovers of glucose oxidase, thereby permitting development of a single-molecule "enzymatic switch". Such an enzymatic switch integrated on a SWNT-based scanning probe will create a mechanism to deliver an exact number of product molecules to a specific location with precise spatial positioning.

Figure 16:
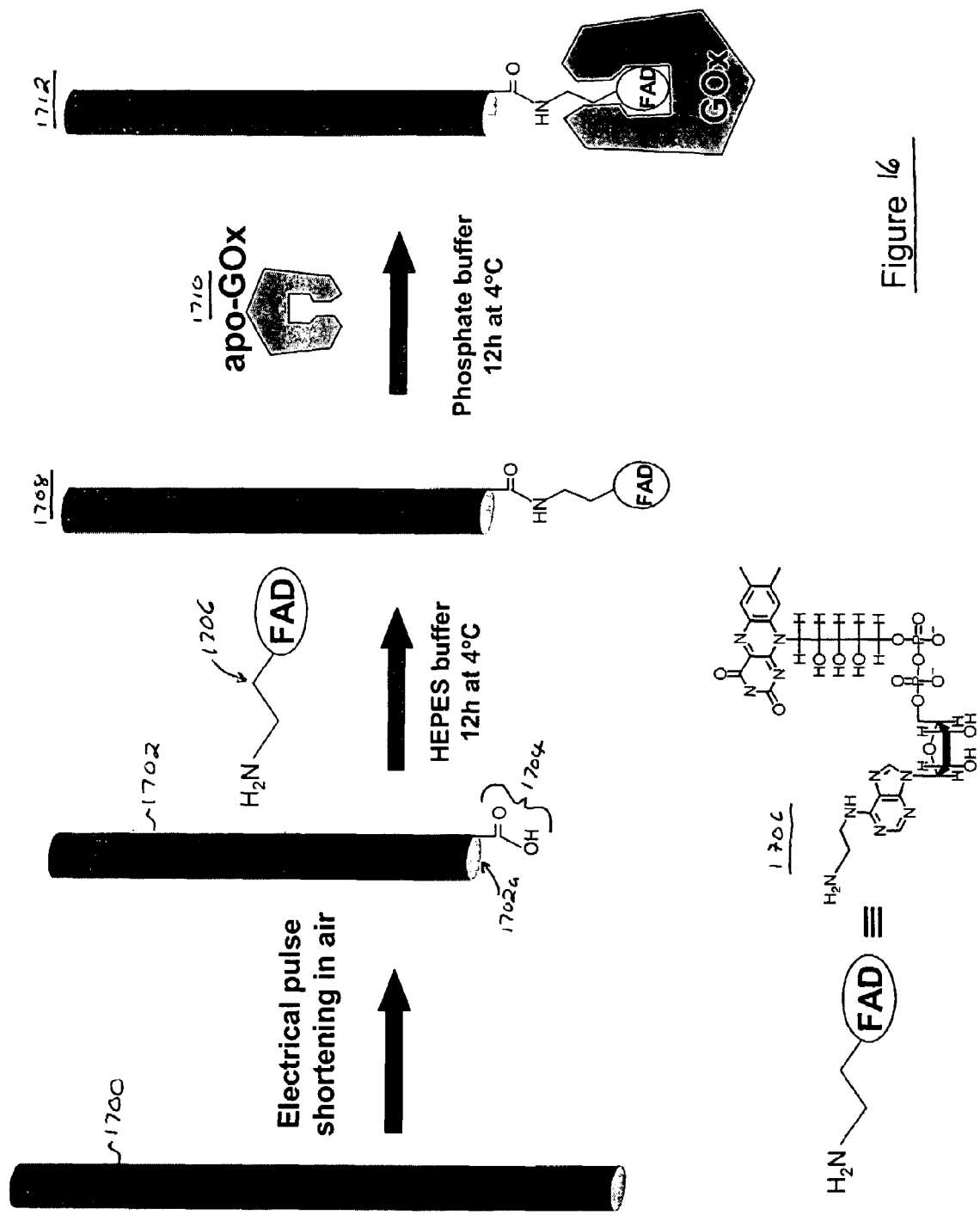
FIG. 16 is a simplified schematic view of the nanowiring of an enzyme to a carbon nanotube.

For example, FIG. 16 shows fabrication of such a nanoelectrode in accordance with one embodiment of the present invention. As shown in FIG. 16, nanotube 1700 attached to an AFM tip (not shown) and coated to preclude non-specific binding, is shortened by exposure to an electrical pulse in air, producing SWNT 1702 having tip 1702a bearing carboxylate group 1704 (COOH). The cofactor flavin adenine dinucleotide (FAD) 1706 is then covalently attached to the SWNT tip (in HEPES buffer for 12 hours @ 4° C.) to form nanoelectrode 1708.

Nanoelectrode 1708 in turn allows an apo-enzyme such as apo-glucose oxidase (apo-GOx) 1710 to reconstitute an active site around the immobilized FAD (in phosphate buffer for 12 hours @4° C.). The result is nanoelectrode 1712 functionalized with a single enzyme, glucose oxidase. Nanoelectrode 1712 allows for transduction of enzymatic activity to a measurable electrical current or fluorescence signature.

Moreover, this concept could be generalized to operate with any redox-cofactor containing enzyme that can be reconstituted from its corresponding apo-protein. For example, a nanoelectrode fabricated with a single glutathione reductase (GR) enzyme could be used as a sensitive probe for glutathione-modulated $Ca^{2+}$ signal transduction cascades triggered by membrane bound N-methyl-d-aspartate (NMDA) receptors in neurons.

GR uses both FAD and NADPH (nicotinamide adenine dinucleotide phosphate) cofactors during the reduction of dimeric glutathione (GSSG) to its monomeric species (GSH). GSH has been implicated as a relatively uncharacterized neurotransmitter and neuromodulator in both the brain and central nervous system. Extracellular GSH initiates the inositol-1,4,5-triphosphate $(IP_3)/Ca^{2+}$ signal transduction cascade via a NMDA-receptor activation event, while GSSG appears to have an inhibitory effect.

In "A Glutathione Amperometric Biosensor Based on an Amphiphilic Fullerene Redox Mediator Immobilised within an Amphiphilic Polypyrrole Film", S. J. Mat. Chem. 12, 1996-2000 (2002), Carano et al. successfully demonstrated integration of GR into amperometric electrodes which can be "turned on" at appropriate voltages.

A GR-functionalized SWNT enzyme probe in accordance with embodiments of the present invention could be switched on for a specific amount of time for the generation of an appropriate, predetermined amount of GSH molecules in the vicinity of a single NMDA receptor or a cluster of receptors. The subsequent evolution of the intracellular $Ca^{2+}$ concentration could then be monitored in real time using a $Ca^{2+}$-dependent cell-permeant fluorophore such as Fluo-3 (Molecular Probes). This would permit observation of the transduction cascade triggered from a point source, as well as determination of the threshold GSH stimulus.

FIG. 17A shows a process for measuring the threshold stimulus required for initiating an intracellular calcium signal transduction cascade. FIG. 17B plots the electrical voltage signal of the nanoelectrode driving this process.

Electrode 1801 comprising glutathione reductase (GR) nanowired to the SWNT tip, is positioned adjacent to membrane 1800 of target cell 1802. A potential is applied to the SWNT and the GR is electrochemically activated. As a result of this activation, the GR reduces a predetermined amount of dimeric glutathione (GSSG) molecules 1804 to the monomeric thiol (GSH) species 1806.

The GSH 1806 then binds to membrane bound protein-coupled receptors 1808, initiating the inositol triphosphate signal transduction pathway and triggering a rise in intracellular $Ca^{2+}$. This rise in the intracellular $Ca^{2+}$ ion may be observed with a calcium-dependent fluorophore.

The above discussion introduces a general method for studying the initiation and propagation of biochemical reaction pathways using enzymatically-driven chemical triggers precisely defined in spatial and temporal coordinates, and in chemical magnitude. By carefully selecting an appropriate biochemical process, such as a signal transduction cascade, this method could elucidate the signal propagation rate and timing between individual chemical steps, or determine the minimum biochemical threshold for initiation.

By contrast, the conventional bulk studies related to the single-molecule, single-stimulus experiments described above, can only determine thresholds in ligand concentrations. These conventional studies would therefore be unable to distinguish repeated stimulation of a single receptor, from single stimulation of multiple receptors.

By contrast, experiments conducted utilizing functionalized SWNT probes in accordance with embodiments of the present invention could make this distinction. SWNT-functionalized probes in accordance with embodiments of the present invention should also exhibit enhanced sensitivity to the effects of receptor clustering and other receptor-receptor interactions, revealing interconnectivity details of multiple signaling pathways in both space and time.

Embodiments of applications for probes in accordance with the present invention are not limited to covalent bonding to the SWNT tip. In accordance with other embodiments, a noncovalent bonding mechanism could also be exploited.

For example, in "Noncovalent Sidewall Functionalization of Single-Walled Carbon Nanotubes for Protein Immobilization", J. Am. Chem. Soc. 123(16), 3838-9 (2001), Chen et al. report noncovalent functionalization of SWNT sidewalls with bifunctional molecules having a pyrenyl group on one end and a succinimidyl ester on the other end. The pyrenyl group is highly aromatic and interacts strongly with the basal plane of graphite and the sidewalls of carbon nanotubes by van der Waals interactions. The succinimidyl esters on the other end of the linker molecules are highly reactive toward amine groups on the surface of most proteins to form amide bonds. Embodiments in accordance with the present invention could utilize similar non-covalent interactions to functionalize the tips of SWNT probes.

4. Solid-State Coatings and Their Uses in the Fabrication of Nanomanipulators and Localized Sensors Another general class of embodiments of the invention relate to coating SWNT scanning probes with one or more solid-state materials in conjunction with, or in addition to the soft materials described above. Examples include, but are not limited to, metals, semiconductors and insulators. These materials may be deposited onto the SWNT AFM tip by evaporation, plasma deposition, sputtering, molecular beam epitaxy or through electrochemical means such as electroplating or chemical condensation reactions.

In addition to expansion of possible biophysical applications, further specific embodiments of the invention may include electronic, magnetic, optical and superconducting solid-state nanosensors.

Many of these devices have analogs in microelectronics. Most solid state devices rely on junctions (Schottky barriers, tunnel junctions, etc.) to create a property. By properly matching the material layers, such junctions, or energy barriers, can be fabricated using the nanotube allowing creation of nanometer scale devices and sensors. Many of these will uniquely benefit though creation of either an active or conductive site or material properties alteration achieved by application of a final shortening pulse. The exposed material is highly localized at the free end of the nanotube.

In one embodiment, the combination of such devices with a scanning probe microscope, such as a closed-loop controlled scanning probe microscope (SPM) such as an atomic force microscope (AFM), will enable ultraprecise position and probing of samples, materials and devices. The small size of these devices will enable exploration of properties for nanoelectronics and even molecular circuitry.

In one subset of embodiments, the SWNT AFM probe may be coated by a metal that has a specific chemical, biological or physical affinity for a target molecule of interest, or it may be further functionalized with a soft material such as a polymer or a self assembled monolayer for capture of a target molecule. Specific examples include, but are not limited to, chemisorption of alkyl thiols on gold surfaces and nitrilotriacetic acid on nickel (NTA-Ni). Alkyl thiols can have their free ends terminated with the same chemical moieties outlined in the previous section for attachment of molecules to derivatized PEG polymers. NTA-Ni has a strong affinity for histidine residues and is a common route for immobilizing proteins and polypeptides.

Metals may be either localized at the SWNT tip or they may be ablated exclusively off the tip. To fabricate a SWNT probe with metal only within a few nanometers from the free end, a resist may be coated onto the SWNT in preliminary step. The resist could comprise a polymer layer or other appropriate material applied to the probe, that can be selectively removed by exposure to an appropriate solvent in a subsequent step. Following ablation of the resist layer from the nanotube tip, the assembly is coated with the metal of interest. Subsequent lift-off of the resist in a suitable solvent (such as acetone) leaves a metal coating only at the very end of the nanotube.

Alternately, the coating could include multiple metals or combinations of metals, semiconductors, insulators (such as oxides) and soft materials. This will extend the types of applications and devices that may be constructed with this invention. Ablation of such a composite coating will result in the formation of a ring structure with a carbon nanotube core at the end face of the nanotube tip.

Composite layers consisting of metals, insulators and semiconductors are fundamental building blocks in many macroscopic solid-state devices. Examples include, but are not limited to, thermocouples based on the Seebeck effect, including Peltier heaters or refrigerators, superconducting quantum interference devices (SQUIDs), transistors, diodes and capacitors. This invention provides for the possibility of fabricating nanometer sized equivalents of these devices, located on the tip of a scanning AFM probe. Alternately these devices could be located on a substrate or structure such that nanopositioning stages can be used to control the relative locations of the materials, molecules, receptors, substrates and devices being characterized, probed, tested or controlled.

Alternately bi- and tri-metallic or polymer coatings or polymer/metallic coatings will enable electrically, thermally and chemically actuated manipulators to be constructed with a range of motion on-order of tube length and a precision on the order of 1 Å or less.

In summary, the localization of the functionalized or active sensing site, together with the ability to attach highly specific molecular sensors at this site, in combination with coatings which prohibit non-specific binding, enables construction of sensors, probes and devices with precise control of location. By combining these tools with existing technologies such as scanning probe microscopes (like AFM), we have the ability to control the position of these nanoscale sensors in such to study samples with exquisite sensitivity and resolution.

Alternately, the localization will enable the manufacture of sensors with active sites of sizes on order of a nanometer in diameter. These sensors and devices will enable extremely high precision and spatial resolution measurements to be conducted to characterize materials, and devices at the nanometer scale. In addition they will enable new classes of devices capable of characterizing and even controlling the behavior of molecular circuits. Finally these devices could be embodied as a new class of nanomanipulators.

And while the present invention has been described in connection with the translation of a functionalized SWNT relative to a target utilizing an AFM tip, embodiments in accordance with the present invention have a much broader range of applicability. In accordance with one alternative embodiment, a functionalized SWNT could be translated proximate to a target environment utilizing other than an AFM tool, for example a nanopositioner or nanoscanner as manufactured by Mad City Labs of Madison, Wis., or by Physik Instrumente (PI) of Karlsruhe, Germany. Still other possible techniques for positioning the functionalized nanotube involve translation of the sample relative to a stationary probe, for example by flowing a sample solution past a functionalized SWNT fixed in a microfluidic flow channel.

It is understood that the examples and embodiments described herein are for illustrative purposes only, and there can be other variations and alternatives. Various modifications or changes in light of the above description thereof will be suggested to persons skilled in the art and are to be included within the spirit and purview of this application and scope of the appended claims.

What is claimed is:

1. A device comprising: a nanostructure having a surface and a passivation layer coating all but a unique site on the surface, the unique site exhibiting at least one of chemical, biological, electrical, and physical activity, wherein the nanostructure comprises a carbon nanotube, wherein a material is attached to the unique site, and wherein a moveable probe is connected to the nanostructure.

2. The device of claim 1, wherein the carbon nanotube is selected from the group consisting of a single-wall carbon nanotube (SWNT), a multi-wall carbon nanotube, and a bundle or rope of SWNTs.

3. The device of claim 1 wherein the passivation layer comprises at least one of a polymer, a semiconductor, and a metal.

4. The device of claim 1 wherein the moveable probe is selected from the group consisting of a scanning probe microscope (AFM), a nanoscanner, and a nanopositioner.

5. The device of claim 1 wherein the unique site comprises an exposed portion of the nanostructure in communication with a source of electrical power.

6. The device of claim 1 wherein the material is selected from the group consisting of a carboxyl group, an amine group, and a molecule covalently bound to one of a carboxyl group and an amine group.

7. The device of claim 1 wherein the material comprises a molecule bound at the unique site with a covalent bond.

8. The device of claim 1 wherein the material comprises a molecule bound at the unique site with other than a covalent bond.

9. A device comprising: a carbon nanotube, wherein the carbon nanotube has a surface and two ends, wherein the carbon nanotube is connected to a moveable probe and wherein one of the ends of the carbon nanotube has a tip; wherein the surface and all but the tip of the carbon nanotube is coated with one or more layers of a material selected from the group consisting of a polymer, a metal, a semiconductor material and an insulator material, wherein the tip of the carbon nanotube exhibits at least one of chemical, biological, electrical, and physical activity.

10. The device of claim 9, wherein the carbon nanotube is selected from the group consisting of a single-wall carbon nanotube (SWNT), a multi-wall carbon nanotube, and a bundle or rope of SWNTs.

11. The device of claim 9 wherein the moveable probe is selected from the group consisting of a scanning probe microscope (AFM), a nanoscanner, and a nanopositioner.

12. The device of claim 9 wherein the tip of the carbon nanotube is in communication with a source of electrical power.

13. The device of claim 9 further comprising a material attached to the tip of the carbon nanotube.

14. The device of claim 13 wherein the material is selected from the group consisting of a carboxyl group, an amine group, and a molecule covalently bound to one of a carboxyl group and an amine group.

15. The device of claim 13 wherein the material comprises a molecule bound at the tip of the carbon nanotube with a covalent bond.

16. The device of claim 9 wherein the material comprises a molecule bound at the tip of the carbon nanotube with other than a covalent bond.

* * * * *

UNITED STATES PATENT AND TRADEMARK OFFICE
CERTIFICATE OF CORRECTION

| | | |
|---|---|---|
| PATENT NO. | : 7,514,214 B2 | Page 1 of 1 |
| APPLICATION NO. | : 10/783713 | |
| DATED | : April 7, 2009 | |
| INVENTOR(S) | : Lawrence A. Wade et al. | |

It is certified that error appears in the above-identified patent and that said Letters Patent is hereby corrected as shown below:

Title Pg, Item (60) "Related U.S. Application Data":

delete "No. 60/499,210" and insert -- No. 60/449,210 --.

Signed and Sealed this

Nineteenth Day of May, 2009

JOHN DOLL
*Acting Director of the United States Patent and Trademark Office*